United States Patent
Kim et al.

(10) Patent No.: US 12,519,971 B2
(45) Date of Patent: Jan. 6, 2026

(54) IMAGE ENCODING/DECODING METHOD AND DEVICE USING SAME

(71) Applicants: Electronics and Telecommunications Research Institute, Daejeon (KR); UNIVERSITY-INDUSTRY COOPERATION GROUP OF KYUNG HEE UNIVERSITY, Yongin-si (KR)

(72) Inventors: Hui Yong Kim, Daejeon (KR); Sung Chang Lim, Daejeon (KR); Jin Soo Choi, Daejeon (KR); Jin Woong Kim, Daejeon (KR); Gwang Hoon Park, Seongnam-si (KR); Kyung Yong Kim, Suwon-si (KR)

(73) Assignees: Electronics and Telecommunications Research Institute, Daejeon (KR); UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 3 days.

(21) Appl. No.: 18/346,914

(22) Filed: Jul. 5, 2023

(65) Prior Publication Data
US 2023/0370633 A1 Nov. 16, 2023

Related U.S. Application Data

(63) Continuation of application No. 17/519,667, filed on Nov. 5, 2021, now Pat. No. 11,743,491, which is a
(Continued)

(30) Foreign Application Priority Data

Oct. 12, 2012 (KR) .................. 10-2012-0113851
Oct. 11, 2013 (KR) .................. 10-2013-0121330

(51) Int. Cl.
*H04N 19/573* (2014.01)
*H04N 19/105* (2014.01)
(Continued)

(52) U.S. Cl.
CPC ......... *H04N 19/573* (2014.11); *H04N 19/105* (2014.11); *H04N 19/136* (2014.11);
(Continued)

(58) Field of Classification Search
None
See application file for complete search history.

(56) References Cited

U.S. PATENT DOCUMENTS 9,143,795 B2   9/2015   Zhou et al.
9,621,888 B2   4/2017   Jeon et al.
(Continued)

FOREIGN PATENT DOCUMENTS

CN   101023662 A   8/2007
CN   101573985 A   11/2009
(Continued)

OTHER PUBLICATIONS

Kim JCTVC-H0039 (Year: 2012).*
(Continued)

*Primary Examiner* — Shadan E Haghani
(74) *Attorney, Agent, or Firm* — NSIP Law

(57) ABSTRACT

The image decoding method according to the present invention comprises the steps of: determining the availability of a block adjacent to a current block; configuring a merge candidate list for the current block on the basis of the result of the determined availability; and performing motion compensation for the current block on the basis of the merge candidate list, wherein the step of determining availability comprises the steps of inducing block availability information on the adjacent block and inducing the availability of
(Continued)

motion information on the adjacent block, and the step of determining the availability of the adjacent block is such that when there is more than one adjacent block, the availability of adjacent blocks can be determined in accordance with a predetermined order restriction.

3 Claims, 12 Drawing Sheets

Related U.S. Application Data continuation of application No. 16/662,266, filed on Oct. 24, 2019, now Pat. No. 11,202,094, which is a continuation of application No. 14/390,135, filed as application No. PCT/KR2013/009122 on Oct. 11, 2013, now Pat. No. 10,506,253.

(51) Int. Cl.
*H04N 19/136* (2014.01)
*H04N 19/436* (2014.01)
*H04N 19/52* (2014.01)
*H04N 19/593* (2014.01)
*H04N 19/61* (2014.01)

(52) U.S. Cl.
CPC ........... *H04N 19/436* (2014.11); *H04N 19/52* (2014.11); *H04N 19/593* (2014.11); *H04N 19/61* (2014.11)

(56) References Cited

U.S. PATENT DOCUMENTS

| | | | |
|---|---|---|---|
| 2008/0107180 A1 | 5/2008 | Lee et al. | |
| 2011/0170601 A1 | 7/2011 | Kim et al. | |
| 2012/0128060 A1 | 5/2012 | Lin et al. | |
| 2012/0134416 A1 | 5/2012 | Lin et al. | |
| 2012/0230408 A1 | 9/2012 | Zhou | |
| 2012/0236941 A1 | 9/2012 | Lin et al. | |
| 2012/0257678 A1 | 10/2012 | Zhou et al. | |
| 2013/0070855 A1 | 3/2013 | Zheng et al. | |
| 2013/0202037 A1 | 8/2013 | Wang et al. | |
| 2013/0343459 A1* | 12/2013 | Bici | H04N 19/105 375/240.16 |
| 2014/0307784 A1 | 10/2014 | Lee et al. | |
| 2015/0103897 A1 | 4/2015 | Kim et al. | |
| 2016/0373784 A1 | 12/2016 | Bang et al. | |
| 2016/0381374 A1 | 12/2016 | Bang et al. | |
| 2017/0078673 A1* | 3/2017 | Kim | H04N 19/105 |

FOREIGN PATENT DOCUMENTS

| | | |
|---|---|---|
| CN | 101617538 A | 12/2009 |
| CN | 101677406 A | 3/2010 |
| CN | 101854540 A | 10/2010 |
| CN | 101924938 A | 12/2010 |
| CN | 102547270 A | 7/2012 |
| JP | 2016-197896 A | 11/2016 |
| JP | 2016-197897 A | 11/2016 |
| JP | 2016-197898 A | 11/2016 |
| KR | 10-2008-0064355 A | 7/2008 |
| KR | 10-2010-0001078 A | 1/2010 |
| KR | 10-2011-0071047 A | 6/2011 |
| KR | 10-2011-0100912 A | 9/2011 |
| KR | 10-2011-0135471 A | 12/2011 |
| KR | 10-2011-0135763 A | 12/2011 |
| KR | 10-2012-0044917 A | 5/2012 |
| TW | 200742442 A | 11/2007 |
| TW | 201223289 A1 | 6/2012 |
| TW | 201230812 A1 | 7/2012 |
| WO | WO 2011/127963 A1 | 10/2011 |
| WO | WO 2012/005520 A2 | 1/2012 |
| WO | WO 2012/030193 A2 | 3/2012 |
| WO | WO 2012/045886 A1 | 4/2012 |
| WO | WO 2012/070827 A2 | 5/2012 |
| WO | WO 2012/124497 A1 | 9/2012 |

OTHER PUBLICATIONS

JCTVC-J1003-d6 (2012).*
Bross, Benjamin, G. J. Sullivan, and Y. K. Wang. "proposed editorial improvements for high efficiency video coding (hevc) text specification draft 8." *JCTVC-K0030 v6, Joint Collaborative Team on Video Coding (JCT-VC) of ITU-T SG16 WP3 and ISO/IEC JTC1/SC29/WG11*, 11th Meeting: Shanghai, CN. 2012.
Kim, Hui Yong et al., "CU-based Merge Candidate List Construction", *Joint Collaborative Team on Video Coding (JCT-VC) of ITU-T SG16 WP3 and ISO/IEC JTC1/SC29/WG11*, 7$^{th}$ Meeting: Geneva, Nov. 21-30, 2011 (15 pages in English).
McCann, Ken et al., "HM5: High Efficiency Video Coding (HEVC) Test Model 5 Encoder Description", *Joint Collaborative Team on Video Coding (JCT-VC) of ITU-T SG16 WP3 and ISO/IEC JTC1/SC29/WG11*, 7$^{th}$ Meeting: Geneva, Switzerland, Nov. 21-30, 2011 (45 pages in English).
Kim, "CE9: Summary report of core experiment on MV coding and Skip/Merge operations," *JCTVC-H0039* (Feb. 2012).
Seregin, "Non-CE9: Moving fifth spatial MV candidate after TMVP for merge mode," *JCTVC-H4029* (Feb. 2012).
Zhou, Minhua. "AHG10: Configurable and CU-group level parallel merge/skip." *JCTVC-H0082* (Feb. 2012). (16 pages, in English).
Kim, Hui Yong et al., "AHG10: Unified design on parallel merge/skip with reduced candidates", *Joint Collaborative Team on Video Coding (JCT-VC) of ITU-T SG16 WP3 and ISO/IEC JTC1/SC29/WG11*, 8$^{th}$ Meeting, San José, California, USA, Feb. 1-10, 2012 (7 pages in English).
Lin, Jian-Liang et al., "3D-CE5.h related: Pruning process for inter-view candidate", *Joint Collaborative Team on Video Coding (JCT-VC) of ITU-T SG16 WP3 and ISO/IEC JTC1/SC29/WG11*, 1$^{st}$ Meeting, Stockholm, Sweden, Jul. 16-20, 2012 (4 pages in English).
Benjamin Bross et al., "High efficiency video coding (HEVC) text specification draft 8", *Joint Collaborative Team on Video Coding (JCT-VC) of ITU-T SG16 WP3 and ISO/IEC JTC1/SC29/WG11* 10th Meeting: Stockholm, SE, Jul. 28, 2012, [JCTVC-J1003_d7] (version 8), 5 pages.
Lin, Yongbing et al., "Removal of dependency between multiple PUs in a CU for parallel merging candidate list construction", *Joint Collaborative Team on Video Coding (JCT-VC) of ITU-T SG16 WP3 and ISO/IEC JTC1/SC29/WG11*, 11$^{th}$ Meeting, Shanghai, China, Oct. 10-19, 2012 (5 pages in English).
International Search Report issued Jan. 8, 2014 in counterpart International Application No. PCT/KR2013/009122 (2 pages in English, 3 pages in Korean).
Korean Office Action issued on Sep. 26, 2014, in counterpart Korean Application No. 10-2013-0142747 (4 pages, in Korean).
Office Action Issued on Nov. 27, 2015, for corresponding Japanese Patent Application No. 2015-512591.

* cited by examiner (a)          (b)

(a)                (b)

PU 2Nx2N 
PU 2NxN 
PU Nx2N 
PU NxN

PU 2NxnU 
PU 2NxnD 
PU nNx2N 
PU nRx2N

IMAGE ENCODING/DECODING METHOD AND DEVICE USING SAME

CROSS-REFERENCE TO RELATED APPLICATIONS

This application is a Continuation application of U.S. patent application Ser. No. 17/519,667, filed on Nov. 5, 2021, which is a Continuation application of U.S. patent application Ser. No. 16/662,266, filed on Oct. 24, 2019, now U.S. Pat. No. 11,202,094, issued on Dec. 14, 2021, which is a Continuation application of U.S. patent application Ser. No. 14/390,135, now U.S. Pat. No. 10,506,253, issued on Dec. 10, 2019, having a 371(c) date of Oct. 2, 2014, which is a U.S. national stage application of International Application No. PCT/KR2013/009122 filed on Oct. 11, 2013, which claims the benefit of Korean Application No. 10-2012-0113851 filed on Oct. 12, 2012, and Korean Application No. 10-2013-0121330 filed on Oct. 11, 2013, in the Korean Intellectual Property Office, the entire disclosures of which are incorporated herein by reference for all purposes.

TECHNICAL FIELD

The present invention relates to video encoding and decoding processing, and more particularly, to a video encoding and decoding method and an apparatus using the same that configure a motion candidate list.

BACKGROUND ART

In recent years, as a broadcasting service having high definition resolution (1280×1024 or 1920 or 1080) has been extended globally as well as domestically, a lot of users have been familiar with a high-resolution, high-definition video now and a lot of institutions have spurred development of a next-generation video apparatus by keeping up therewith. Further, moving picture standardization groups have perceived the necessity of compression technology of a higher-resolution, higher-definition video with an increase of a concern about ultra high definition (UHD) having four times higher resolution than an HDTV as well as the HDTV. In addition, a new standard is urgently needed, which can acquire a lot of gains in terms of a frequency band or storage while maintaining the same definition through higher compression efficiency than H.264/AVC used in the HDTV, a cellular phone, and a blu-ray player at present. At present, Moving Picture Experts Group (MPEG) and Video Coding Experts Group (VCEG) commonly aims at standardizing High Efficiency Video Coding (HEVC) which is a next-generation video codec and encoding a video including a UHD video with twice higher compression efficiency than the H.264/AVC. This can provide a high-definition video at a lower frequency than at present even in 3D broadcasting and a mobile communication network as well as the HD and UHD videos.

At present, the HEVC sets a codec called an HEVC test model (HM) through a contribution of each institution after a first Joint Collaboration Team Video Coding (JCT-VC) meeting was opened in April, 2010.

DISCLOSURE

Technical Problem

An object of the present invention is to provide a method for determining whether a neighboring block is usable and an apparatus using the same, in configuring a motion candidate list.

Further, another object of the present invention is to provide a method for providing parallelism between prediction units within a coding unit and an apparatus using the same, in configuring a motion candidate list.

Yet another object of the present invention is to improve video encoding and decoding efficiency.

Technical Solution

In accordance with an aspect of the present invention, there is provided a video decoding method, including the steps of: determining availability for a neighboring block of a current block; configuring a merge candidate list for the current block based on a result of the availability determination; and performing motion compensation for the current block based on the merge candidate list, and the step of determining the availability includes the step of deriving block availability information for the neighboring block; and the step of deriving availability for motion information of the neighboring block, and in the step of determining the availability for the neighboring block, when the neighboring block is multiple, availability for the neighboring blocks is determined according to a predetermined order restriction.

When the position of the current block is (xP, yP), the neighboring block may include a first block including a pixel that is present at (xP−1, yP+nPSH), a second block including a pixel that is present at (xP−1, yP+nPSH−1), a third block including a pixel that is present at (xP+nPSW, yP−1), a fourth block including a pixel that is present at (xP+nPSW−1, yP−1), and a fifth block including a pixel that is present at (xP−1, yP−1).

in the step of determining the availability for the neighboring block, when the neighboring block is multiple, availability for the neighboring blocks may be determined according to a predetermined order restriction and when the merge candidate lists of the current block and the neighboring block are disabled to be derived in parallel, the block availability information may be set as false (0).

Setting the block availability information as false may mean that the corresponding block is not present or encoded in an intra-mode.

In the step of determining the availability for the neighboring block, the partition form of the current block is one of PART_N×2N, PART_nL×2N, and PART_nR×2N and the index for the current block in the coding unit, partIdx is '1', the block availability information for the second block may be set as false (0).

In the step of determining the availability for the neighboring block, the partition form of the current block is one of PART_2N×N, PART_2N×n, and PART_2N×nD and the index for the current block in the coding unit, partIdx is '1', the block availability information for the fourth block may be set as false (0).

In the step of deriving the availability for the motion information of the neighboring block, the availability for the motion information of the second block may be derived earlier than the availability for the motion information of the first, third block, fourth, and fifth blocks.

In the step of deriving the availability for the motion information of the neighboring block, the availability for the motion information of the fourth block may be derived earlier than the availability for the motion information of the third and fifth blocks.

In the step of deriving the availability for the motion information of the neighboring block, the availability for the motion information of the fifth block may be derived later than the availability for the motion information of the first, second, third, and fourth blocks.

The step of deriving the availability for the motion information of the neighboring block may be performed in the order of the second block, the fourth block, the third block, the first block, and the fifth block.

In the step of deriving the block availability information, when the neighboring block is not present or encoded in an intra-mode, the block availability information may be set as false (0), and when the block availability information is set as false (0), the availability for the motion information may be set to 0.

In the step of deriving the block availability information, when the block availability information of the second block is true (1), and the motion information of the second block and the motion information of the fourth block are the same as each other, the availability for the motion information of the fourth block may be set to 0.

In the step of deriving the block availability information, when the block availability information of the fourth block is true (1), and the motion information of the fourth block and the motion information of the third block are the same as each other, the availability for the motion information of the third block may be set to 0.

In the step of deriving the block availability information, when the block availability information of the second block is true (1), and the motion information of the second block and the motion information of the first block are the same as each other, the availability for the motion information of the first block may be set to 0.

In the step of deriving the block availability information, when the block availability information of the second block is true (1), and the motion information of the second block and the motion information of the fifth block are the same as each other, the availability for the motion information of the fifth block may be set to 0.

In the step of deriving the block availability information, when the block availability information of the fourth block is true (1), and the motion information of the fourth block and the motion information of the fifth block are the same as each other, the availability for the motion information of the fifth block may be set to 0.

In the step of deriving the availability for the motion information of the neighboring block, the availability for the motion information of all of the first, second, third, and fourth blocks is 1, the availability for the motion information of the fifth block may be set to 0.

In accordance with another aspect of the present invention, a video decoding apparatus includes: an entropy coding module encoding information on a merge candidate list used to perform an inter-screen prediction of a current block; and a prediction module determining availability for a neighboring block of the current block, configuring a merge candidate list for the current block based on a result of the availability determination, and performing motion compensation for the current block based on the merge candidate list, the prediction module, in order to determine the availability, derives block availability information for the neighboring block and derives availability for motion information of the neighboring block, and determines availability for the neighboring blocks according to a predetermined order restriction when the neighboring block is multiple.

Advantageous Effects

According to embodiments of the present invention, provided are a method for determining whether a neighboring block is usable and an apparatus using the same, in configuring a motion candidate list.

Further, according to the present invention, provided are a method for providing perfect parallelism between prediction units within a coding unit and an apparatus using the same.

Therefore, provided are a method and an apparatus for video encoding/decoding that can improve video encoding and decoding efficiency.

MODE FOR INVENTION

Hereinafter, embodiments of the present invention will be described in detail with reference to the accompanying drawings. In describing the embodiments of the present specification, when it is determined that the detailed description of the known art related to the present invention may obscure the gist of the present invention, the detailed description thereof will be omitted.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. Moreover, a content of describing "including" a specific component in the present invention does not exclude a component other than the corresponding component and means that an additional component may be included in the embodiments of the present invention or the scope of the technical spirit of the present invention.

Terminologies such as first or second may be used to describe various components but the components are not limited by the above terminologies. The above terminologies are used only to discriminate one component from the other component. For example, without departing from the scope of the present invention, a first component may be referred to as a second component, and similarly, a second component may be referred to as a first component.

Further, components described in the embodiments of the present invention are independently illustrated in order to show different characteristic functions and each component is not constituted by separated hardware or one software constituting unit. That is, each component is arranged and included as the respective components and at least two components among the respective components are added up to form one component or one component is divided into a plurality of components to perform functions and the integrated embodiment and separated embodiments of each component are also included in the scope of the present invention without departing from the spirit of the present invention.

Further, some components are not requisite components that perform essential functions but selective components for just improving performance in the present invention. The present invention may be implemented with the requisite component for implementing the spirit of the present invention other than the component used to just improve the performance and a structure including only the requisite component other than the selective component used to just improve the performance is also included in the scope of the present invention.

Figure 1:
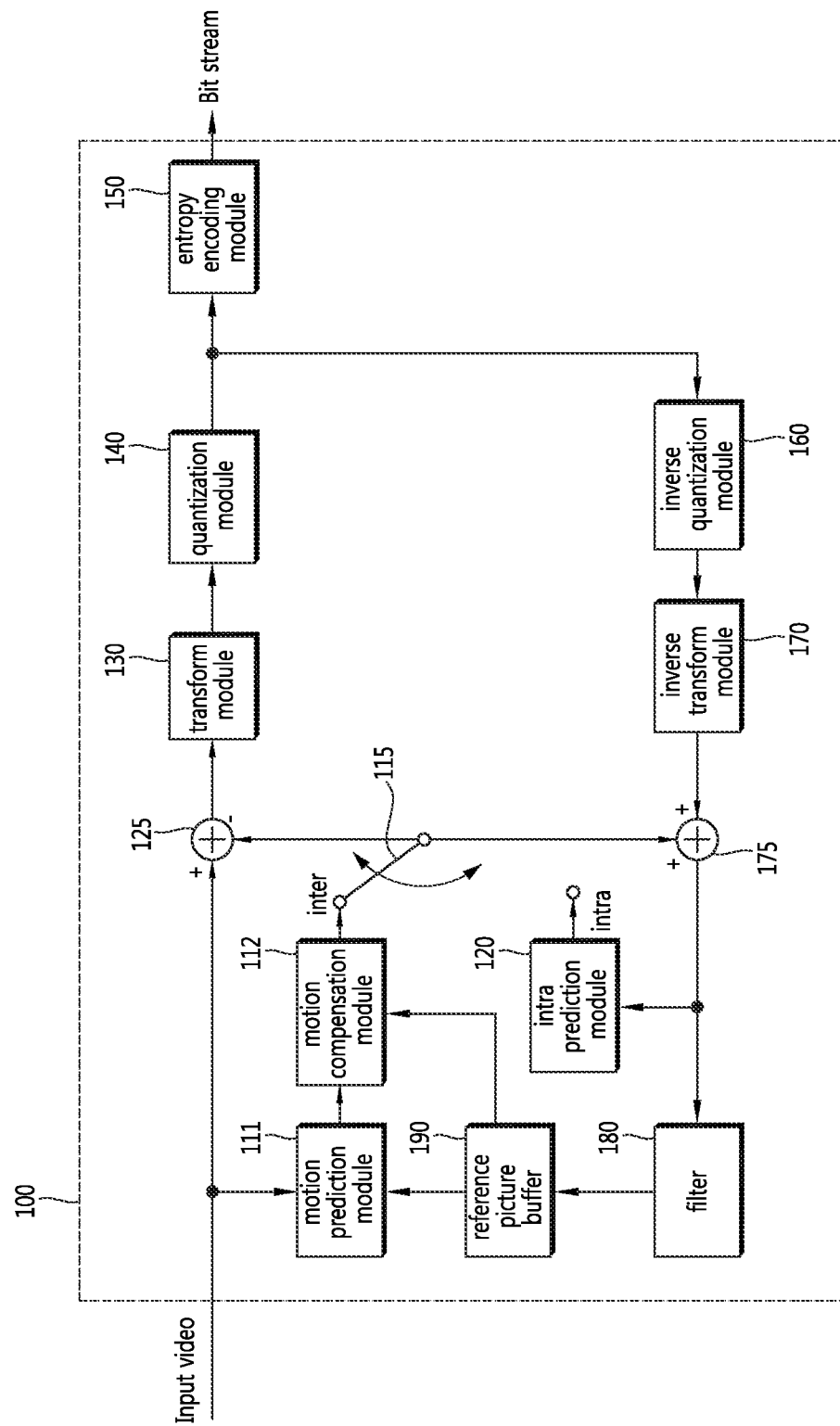
FIG. 1 is a block diagram illustrating a configuration of a video encoding apparatus according to an embodiment of the present invention.

FIG. 1 is a block diagram illustrating a configuration of a video encoding apparatus according to an embodiment of the present invention.

Referring to FIG. 1, the video encoding apparatus 100 includes a motion prediction module 111, a motion compensation module 112, an intra prediction module 120, a switch 115, a subtractor 125, a transform module 130, a quantization module 140, an entropy coding module 150, an inverse quantization module 160, an inverse transform module 170, an adder 175, a filter module 180, and a reference video buffer 190.

The video encoding apparatus 100 may code an input video in an intra mode or an inter mode, and output a bitstream. The intra prediction means a prediction in a screen, and the inter prediction means a prediction between screens. In the intra mode, the switch 115 is shifted to the intra, and in the inter mode, the switch 115 is shifted to the inter mode. The video encoding apparatus 100 generates a prediction block for an input block of the input video, and then may code a difference between the input block and the prediction block.

In the intra mode, the intra prediction module 120 performs a spatial prediction by using a pixel value of a pre-coded block around a current block to generate the prediction block.

In the inter mode, the motion prediction module 111 may find a region which is most matched with the input block in a reference video stored in the reference video buffer 190 during the motion prediction process to calculate a motion vector. The motion compensation module 112 corrects the motion by using the motion vector and the reference video stored in the reference video buffer 190 to generate the prediction block.

The subtractor 125 may generate a residual block by the difference between the input block and the generated prediction block. The transform module 130 performs transform for the residual block to output a transform coefficient. In addition, the quantization module 140 quantizes the input transform coefficient according to a quantization parameter to output a quantized coefficient.

The entropy coding module 150 entropy-codes symbols according to probability distribution based on values calculated from the quantization module 140 or coding parameter values calculated in the coding process to output a bitstream. The entropy coding method is a method in which symbols having various values are received and expressed by decodable binary strings while removing statistical redundancy.

Here, the symbol means a coding/decoding target syntax element, a coding parameter, a value of a residual signal, and the like. The coding parameter, as a parameter required for encoding and decoding, may include not only information coded in the encoding apparatus to be transferred to the decoding apparatus like the syntax element, but also information which may be inferred from the encoding or decoding process, and means information required when the video is coded or decoded. The coding parameter may include values or statistics of for example, an intra/inter prediction mode, a movement/motion vector, a reference video index, an encoding block pattern, presence of a residual signal, a transform coefficient, a quantized transform coefficient, a quantization parameter, a block size, block segment information, and the like. Further, the residual signal may mean a difference between an original signal and a prediction signal, and may also mean a signal having a transformed form of the difference between the original signal and the prediction signal or a signal having a transformed and quantized form of the difference between an original signal and a prediction signal. The residual signal may be referred to as a residual block in a block unit.

In the case where the entropy coding is applied, a few of bits are allocated to a symbol having high occurrence probability and a lot of bits are allocated to a symbol having low occurrence probability to express the symbols, and as a result, a size of a bitstream for coding target symbols may be reduced. Accordingly, compression performance of video coding may be enhanced through the entropy coding.

For the entropy coding, coding methods such as exponential golomb, context-adaptive variable length coding (CAVLC), and context-adaptive binary arithmetic coding (CABAC) may be used. For example, a table for performing the entropy coding such as a variable length coding/code (VLC) table may be stored in the entropy coding module 150, and the entropy coding module 150 may perform the entropy coding by using the stored VLC table. Further, the entropy coding module 150 derives a binarization method of a target symbol and a probability model of a target symbol/bin, and then may also perform the entropy coding by using the derived binarization method or probability model.

The quantized coefficient may be inversely quantized in the inverse quantization module 160 and inversely transformed in the inverse transform module 170. The inversely quantized and inversely transformed coefficient is added to the prediction block by the adder 175 to generate a restore block.

The restore block passes though the filter module 180, and the filter module 180 may apply at least one of a deblocking filter, a sample adaptive offset (SAO), and an adaptive loop filter (ALF) to the restore block or a restore picture. The restore block passing through the filter module 180 may be stored in the reference image buffer 190.

Figure 2:
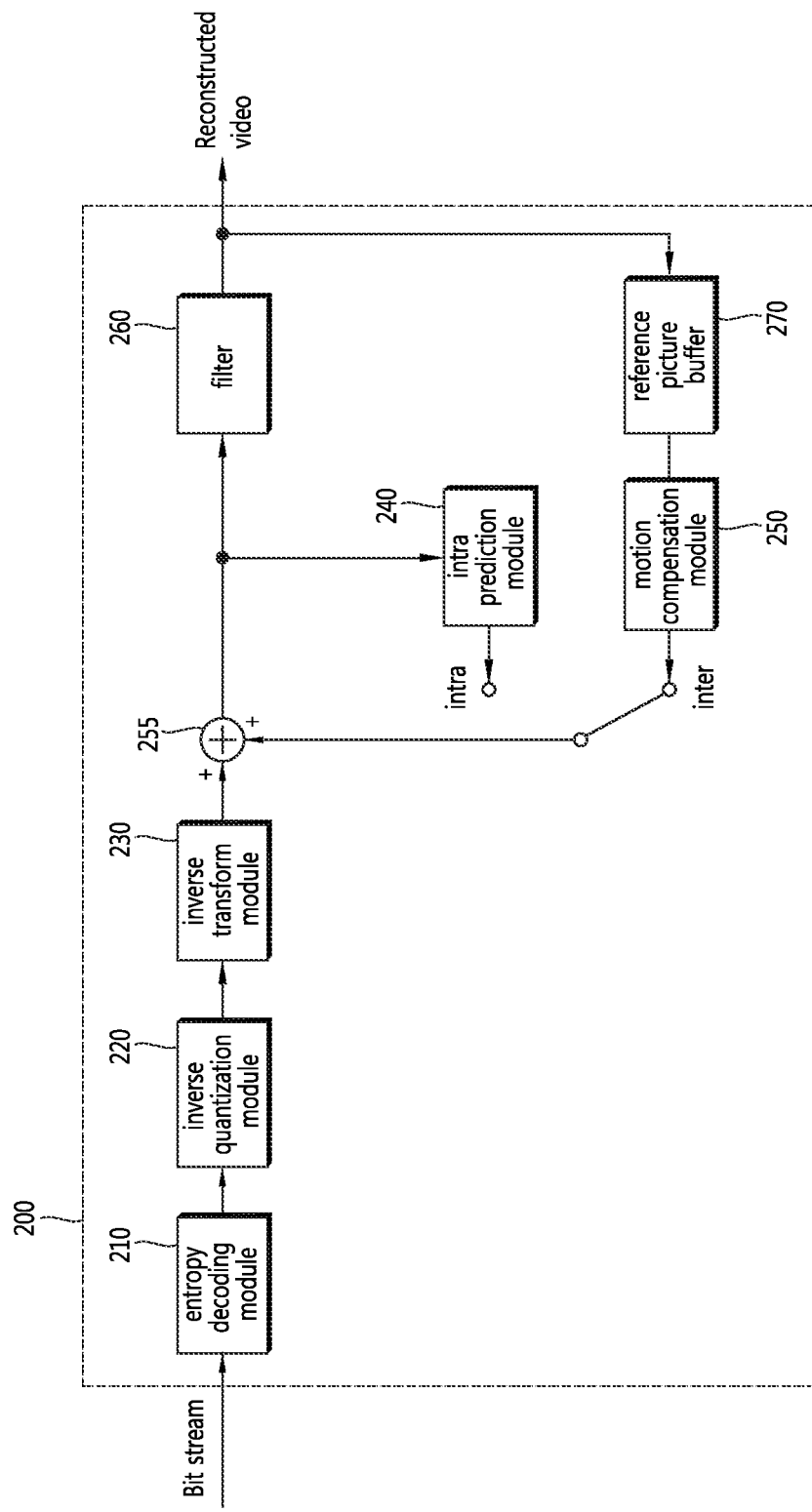
FIG. 2 is a block diagram illustrating a configuration of a video decoding apparatus according to an embodiment of the present invention.

FIG. 2 is a block diagram illustrating a configuration of a video decoding apparatus according to an embodiment of the present invention. Referring to FIG. 2, the video decoding apparatus 200 includes an entropy coding module 210, an inverse quantization module 220, an inverse transform module 230, an intra prediction module 240, a motion compensation module 250, a filter module 260, and a reference video buffer 270.

The video decoding apparatus 200 receives a bitstream output from the encoding apparatus to perform decoding in an inter mode or an inter mode and output a reconfigured video, that is, a restore video. In the intra mode, the switch may be shifted to the intra, and in the inter mode, the switch may be shifted to the inter mode. The video decoding apparatus 200 obtains a residual block restored from the input bitstream and generates a prediction block, and then may generate the reconfigured block, that is, the restore block by adding the restored residual block and the prediction block.

The entropy decoding module 210 entropy-decodes the input bitstream according to probability distribution to generate symbols including a symbol having a quantized coefficient form. The entropy decoding method is a method of receiving binary strings to generate respective symbols. The entropy decoding method is similar to the aforementioned entropy coding method.

The quantized coefficient is inversely quantized in the inverse quantization module 220 and inversely transformed in the inverse transform module 230, and as a result, a restored residual block may be generated.

In the intra mode, the intra prediction module 240 performs a spatial prediction by using a pixel value of a pre-encoded block around a current block to generate the prediction block. In the inter mode, the motion compensation module 250 corrects the motion by using the motion vector and the reference video stored in the reference video buffer 270 to generate the prediction block.

The restored residual block and the prediction block are added by the adder 255, and the added blocks pass through the filter module 260. The filter module 260 may apply at least one of a deblocking filter, an SAO, and an ALF to the restore block or the restore picture. The filter module 260 outputs the reconfigured video, that is, the restore video. The restore video may be stored in the reference video buffer 270 and used for prediction between screens.

Among the entropy coding module 210, the inverse quantization module 220, the inverse transform module 230, the intra prediction module 240, the motion compensation module 250, the filter module 260, and the reference video buffer 270 included in the video decoding apparatus 200, constituent elements directly related to the video decoding, for example, the entropy coding module 210, the inverse quantization module 220, the inverse transform module 230, the intra prediction module 240, the motion compensation module 250, the filter module 260, and the like are separated from other constituent elements to be expressed as a decoding module.

Further, the video decoding apparatus 200 may further include a parsing module (not illustrated) parsing information regarding the encoded video included in the bitstream. The parsing module may include the entropy decoding module 210, and may also be included in the entropy decoding module 210. The parsing module may be further implemented as one constituent element of the decoding module.

Generally, in the prediction between the screens, at least one of a previous picture or a next picture of the current picture is referred to as a reference picture, and prediction for the current block may be preformed based on the reference picture. A video used for the prediction of the current block is referred to as a reference picture or a reference frame.

A region in the reference picture may be represented by using a reference picture index refIdx indicating the reference picture, the motion picture, and the like.

In the prediction between the screens, the reference block corresponding to the reference picture and the current block in the reference picture is selected to generate the prediction block for the current block.

In the prediction between the screens, the encoding apparatus and the decoding apparatus derive motion information of the current block and then perform the prediction between the screens and/or the motion compensation based on the derived motion information. In this case, the encoding apparatus and the decoding apparatus use motion information of a restored neighboring block and/or a collocated block corresponding to the current block in a pre-restored collocated picture, thereby improving coding/decoding efficiency.

Here, the restored neighboring block, as a block in the restored current picture which is pre-coded and/or decoded, may include a block adjacent to the current block and/or a block positioned at an outer corner of the current block. Further, the encoding apparatus and the decoding apparatus may determine a relatively predetermined position based on a block that is present at a position spatially corresponding to the current block in the collocated picture, and derive the collocated block based on the determined relative position (internal and/or external position of the block that is present at the position spatially corresponding to the current block). Here, as an example, the collocated picture may correspond to one picture among reference pictures included in a reference picture list.

In the prediction between screens, the prediction block may be generated so that a residual signal with the current block is minimized and the size of the motion vector is minimized.

Meanwhile, a method of deriving the motion information may vary according to a prediction mode of the current block. The prediction mode applied for the inter prediction may include an advanced motion vector predictor (AMVP), a merge, and the like.

For example, in the case of applying the advanced motion vector predictor (AMVP), the encoding apparatus and the decoding apparatus may generate a prediction motion vector candidate list, by using the motion vector of the restored neighboring block and/or the motion vector of the collocated block. That is, the motion vector of the restored neighboring block and/or the motion vector of the collocated block may be used as a prediction motion vector candidate. The encoding apparatus may transmit a prediction motion vector index indicating an optimal prediction motion vector selected among the prediction motion vector candidates included in the list, to the decoding apparatus. In this case, the decoding apparatus may select the prediction motion vector of the current block among the prediction motion vector candidates included in the prediction motion vector candidate list, by using the prediction motion vector index.

The encoding apparatus may calculate a motion vector difference (MVD) between the motion vector of the current block and the prediction motion vector, and may code the motion vector difference (MVD) to transmit the coded motion vector difference (MVD) to the decoding apparatus. In this case, the decoding apparatus may decode the received motion vector difference, and may derive the motion vector of the current block through a sum of the decoded motion vector difference and the prediction motion vector.

The encoding apparatus may further transmit the reference picture index indicating the reference picture and the like to the decoding apparatus.

The decoding apparatus predicts the motion vector of the current block by using the motion information of the neighboring block, and may derive the motion vector of the current block by using the residual received from the encoding apparatus. The decoding apparatus may generate the prediction block for the current block based on the derived motion vector and the reference picture index information received from the encoding apparatus.

In the case of a skip mode which is one of other modes used in the prediction between the screens, information of the neighboring block may be used in the current block as it is. Accordingly, in the case of the skip mode, the encoding apparatus does not transmit syntax information such as residual other than information indicating whether motion information of any block is used as the motion information of the current block.

As another example, in the case where merge motion, that is, the merge is applied, the encoding apparatus and the decoding apparatus may generate a merge motion candidate list (merge candidate list) by using the motion information of the restored neighboring block and/or the motion information of the collocated block. In this case, the motion information includes at least one of the motion vector, the index for the reference video, and a prediction direction (uni-direction, bi-direction, and the like).

The merge motion may be a merge motion of a coding unit (hereinafter, referred to as a "CU") and a merge motion of a prediction unit (hereinafter, referred to as a "PU"). In the case of performing the merge motion by the CU or the PU (hereinafter, for convenience, referred to as a 'block') unit, there is a need to transmit information regarding whether the merge motion is performed for each block partition, and information regarding whether the merge motion is performed with any block among the neighboring blocks adjacent to the current block (a left adjacent block of the current block, an upper adjacent block of the current block, a temporally adjacent block of the current block, and the like).

The merge motion candidate list represents a list in which the motion information is stored, and is generated before the merge motion is performed. Here, the motion information stored in the merge motion candidate list may be motion information of the neighboring block adjacent to the current block or motion information of a block collocated to the current block in the reference video. Further, the motion information stored in the merge motion candidate list may be new motion information made by combining the motion information which is present in the merge motion candidate list in advance.

Figure 3:
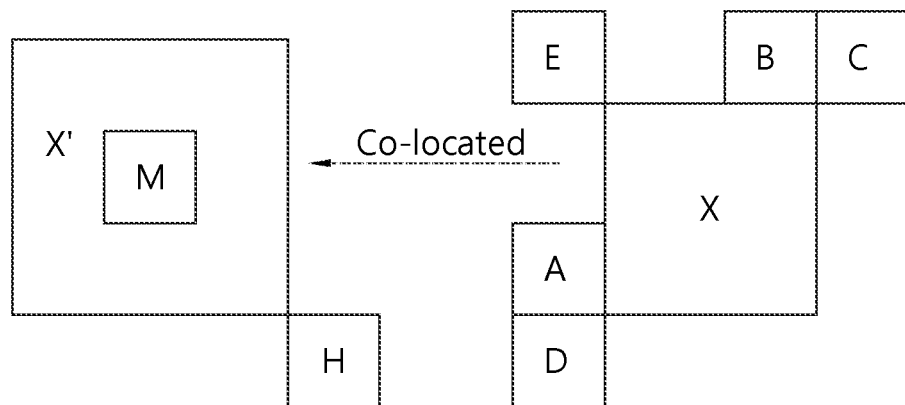
FIG. 3 is a diagram illustrating one example of a neighboring blocks of a current block used as a merge motion candidate list.

FIG. 3 is a diagram illustrating one example of neighboring blocks of a current block used as a merge motion candidate list.

The merge motion candidate list determines whether motion information of the corresponding block may be used for the merge motion of the current block with respect to neighboring blocks A, B, C, D, and E of FIG. 3 and a candidate block H or M at the same position, and in the case of using the motion information, the motion information of the corresponding block may be input in the merge motion candidate list.

The same position candidate block used as a temporal candidate prediction block may be a prediction block H including a pixel having a position (xP+nPSW, yP+nPSH) in the collocated picture of the current block based on a pixel position (xP, yP) in the picture including the current block or a prediction block M including a pixel having a position (xP+(nPSW>>1), yP+(nPSH>>1)), in the case where a prediction block including a pixel having a position (xP+nPSW, yP+nPSH) is unusable.

In the case where each neighboring block verifies whether or not to have the same motion information and has the same motion information, the motion information of the corresponding neighboring block is not included in the merge motion candidate list.

As an embodiment, in FIG. 3, when a merge motion candidate list for a block X is generated, the neighboring block A is usable and included in the merge motion candidate list, and the neighboring block B may be included in the merge motion candidate list only when the neighboring block B does not have the same motion information as the neighboring block A. In the same manner, the neighboring block C may be included in the merge motion candidate list only when the neighboring block C does not have the same motion information as the neighboring block B. In the same manner, this may be applied to the neighboring block D and the neighboring block E.

Here, the same motion information may mean using the same motion vector and the same reference picture, and using the same prediction direction (uni-direction (forward direction and backward direction), and bi-direction).

Finally, in FIG. 3, the merge motion candidate list for the block X may be added in a predetermined order, for example, a block order of A→B→C→D→E→H (or M).

Figure 4:
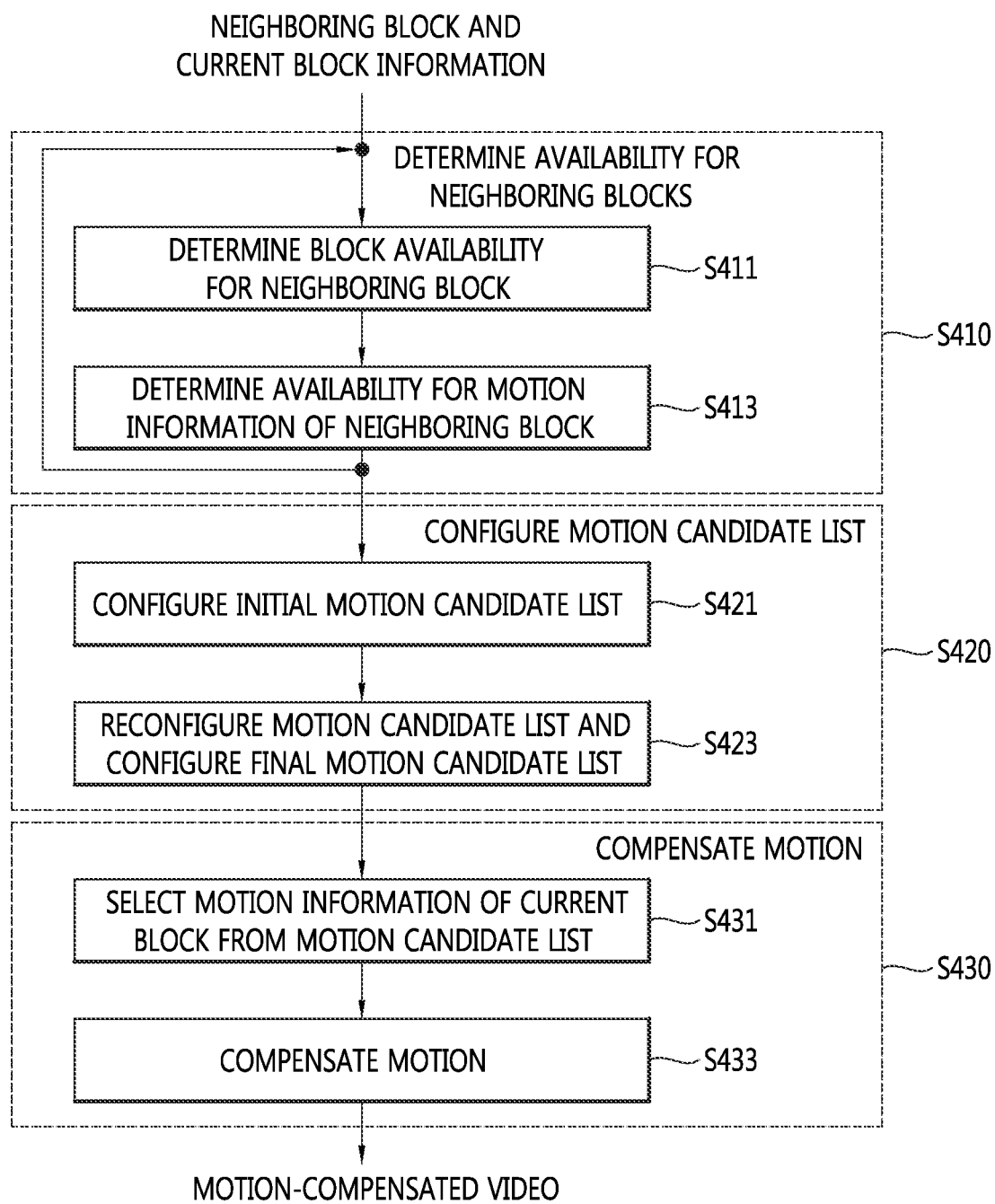
FIG. 4 is a control flowchart for describing a motion compensation process in inter-screen encoding.

FIG. 4 is a control flowchart for describing a motion compensation process in inter-screen coding.

As illustrated in FIG. 4, in the motion compensation process, when information on the current block and the neighboring block is input, availability for the neighboring blocks is determined (S410), a motion candidate list is configured (S420), motion information for the current block is output through the configured motion candidate list, and finally, a video in which the motion is corrected is output (S430).

In FIG. 4, the neighboring blocks used for configuring the motion candidate list for the current block may be variously set in plural, and for example, may be the neighboring blocks A, B, C, D, and E and the candidate block H or M at the same position.

As a first step of FIG. 4, determining availability of the neighboring block (S411) is a process of determining that the corresponding block is available when the corresponding neighboring block is present, and as a result of determining the availability, block availability information is output. Here, the presence of the neighboring block may mean that the neighboring block is present in the same video (picture), a slice, and a tile to which the current block belongs to be accessible in the decoding process. In the present invention, the determining may be used as a meaning of decision or setting. In the determining of the availability, additionally, only in the case where the corresponding neighboring block is not coded in the screen, it may be determined that the corresponding neighboring block is available.

As a determined result, when the block availability information is '1', the corresponding block is usable (for example, is present in the video), and when the block availability information is '0', the corresponding block is unusable (for example, positioned outside the video and does not be present), or vice versa.

Next, availability for motion information of the neighboring block is determined based on the block availability information (S413). As a result, availability information of the block motion information representing whether the motion information of the corresponding neighboring block is included in the motion candidate list of the current block is output.

Here, when the availability information of the block motion information is '1', the corresponding block is usable, and when the availability information is '0', the corresponding block is unusable, or vice versa.

According to the present invention, the determining of the availability of the motion information for the neighboring blocks may be performed in a random order, and a predetermined order restriction between the neighboring blocks needs to be followed.

When the determining of the determining of the availability of the motion information for the neighboring blocks of the motion information for the neighboring blocks is completed, an initial motion candidate list is configured based on the availability information of the block motion information (S421), and the neighboring blocks of FIG. 3 may be added to the motion candidate list in the order of A, B, C, D, E, H, and M.

Thereafter, the motion candidate list may be reconfigured, and a final motion candidate list may be configured through the reconfiguration process (S423).

The motion information of the current block among motion candidates included in the final motion candidate list is selected (S431), and the motion compensation for the current block is performed by using the selected motion information (S423). The video in which the motion is corrected is output through the process of FIG. 4.

The encoding apparatus may select a merge motion candidate which may provide optimal coding efficiency among the merge motion candidates included in the merge motion candidate list as the motion information for the current block. In the merge motion candidate list, an index for a candidate in which the current block performs the merge motion is referred to as a merge motion index merge_idx (hereinafter, referred to as the 'merge_idx'), and the selected merge index is included in the bitstream to be transmitted to the decoding apparatus.

In the case where the same motion information is present in the merge motion candidate list, only one of the same motion informations is left in the merge motion candidate list. The number of motion information in the merge motion candidate list may be set as a predetermined number. For example, the number of motion informations in the merge motion candidate list may be set as maximum five (or a predetermined number).

The decoding apparatus may select one of merge candidates included in the merge motion candidate list by using the transmitted merge index, and may determine the selected merge candidate as the motion information of the current block. Accordingly, in the case where the merge motion mode is applied, the motion information of the restored neighboring block and/or the collocated block may be used as the motion information of the current block as it is. The decoding apparatus may restore the current block by adding the prediction block and the residual transmitted from the encoding apparatus.

When the merge motion index value is not indicated, the index value may be inferred as '0'.

Figure 5:
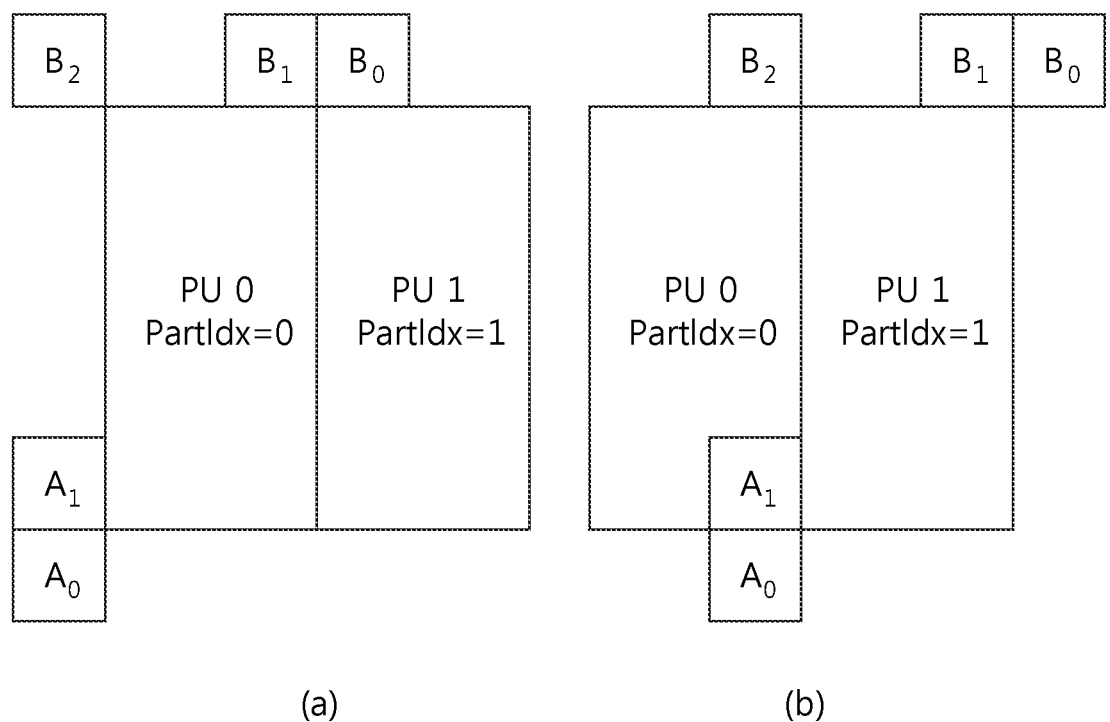
FIG. 5 is a diagram illustrating one example of setting the merge motion candidate list when one CU is divided into two PUs according to one example.

FIG. 5 is a diagram illustrating one example of setting the merge motion candidate list, when one CU is divided into two PUs according to an embodiment. As illustrated in FIG. 5, the CU is partitioned into N×2N, and PartIdx of a first left prediction block PU 0 is identified as 0, and PartIdx of a second right prediction block PU1 is identified as 1.

The motion information of the neighboring block for the PU may be motion information of neighboring blocks A0, A1, B0, B1, and B2 adjacent to the current block or motion information of a block (not illustrated) collocated to the current block in the reference video. FIG. 5A illustrates neighboring blocks used for configuring the merge motion candidate list for PU 0, and FIG. 5B illustrates neighboring blocks used for configuring the merge motion candidate list for PU 1.

When the merge motion candidate list for PU 1 is configured, the merge motion candidate list may be configured in parallel with another PU so as not to refer to motion information of another PU in the same CU, and to this end, in FIG. 5B, a block A, at the PU 0 may not be included in the merge motion candidate list of the PU 1. That is, in FIG. 5B, the block A, at the PU 0 may not be used for the configuration of the merge motion candidate list of the PU 1 and the motion information of the block A, may not be accessed when the merge motion candidate list for PU 1 is configured (or motion information may not be present, or there may be no availability of the block motion information).

Figure 6:
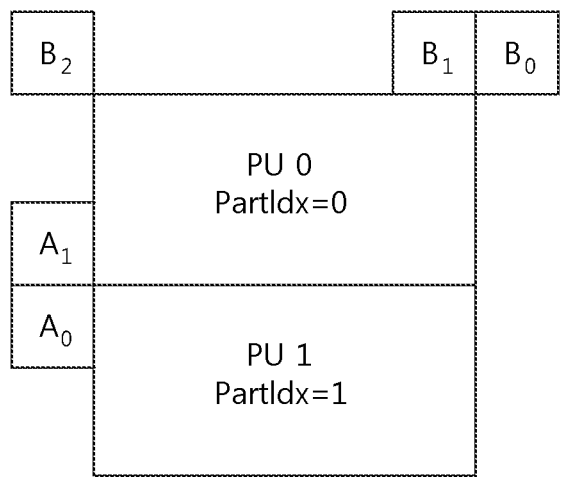
FIG. 6 is a diagram illustrating one example of setting the merge motion candidate list when one CU is divided into two PUs according to another example.
Figure 6:
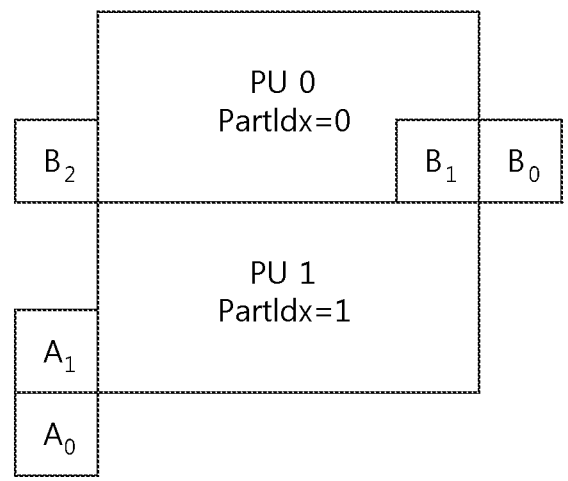

FIG. 6 is a diagram illustrating one example of setting the merge motion candidate list, when one CU is divided into two PUs according to another embodiment. As illustrated in FIG. 6, the CU is partitioned as 2N×N, and in a first upper prediction block, PU 0, PartIdx is identified as 0, and in a lower right prediction block PU1, PartIdx is identified as 1.

The motion information of the neighboring block for the PU may be motion information of neighboring blocks A0, A1, B0, B1, and B2 adjacent to the current block or motion information of a block (not illustrated) collocated to the current block in the reference video. FIG. 6A illustrates neighboring blocks used for configuring the merge motion candidate list for PU 0, and FIG. 6B illustrates neighboring blocks used for configuring the merge motion candidate list for PU 1.

When the merge motion candidate list for PU 1 is configured, the merge motion candidate list may be configured in parallel with another PU so as not to refer to motion information of another PU in the same CU, and to this end, in FIG. 6B, a block B, at the PU 0 may not be included in the merge motion candidate list of the PU 1. That is, in FIG. 6B, the block B, at the PU 0 may not be used for the configuration of the merge motion candidate list of the PU 1 and the motion information of the block A, may not be accessed when the merge motion candidate list for PU 1 is configured (or motion information may not be present, or there may be no availability of the block motion information).

Meanwhile, the present invention relates to a method and an apparatus of deriving motion candidate availability for neighboring blocks adjacent to a target block (called a current block) configured in the motion candidate list when the motion candidate list for motion prediction is configured.

Figure 7:
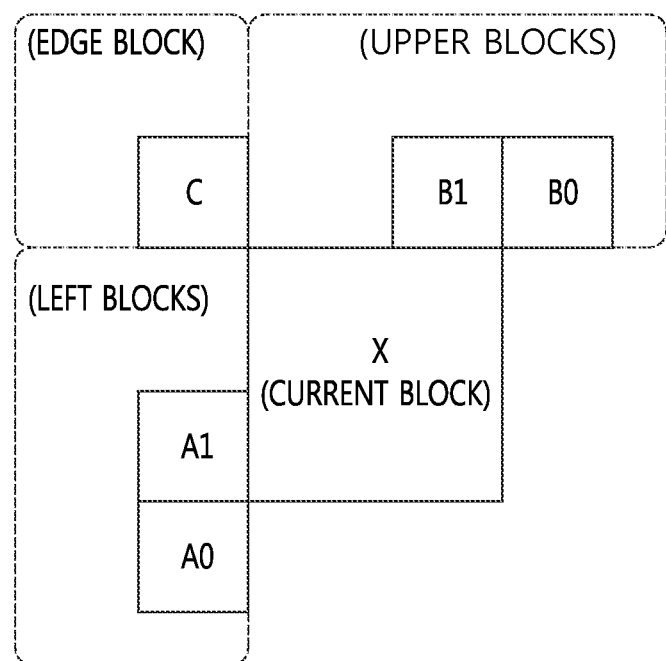
FIG. 7 is a diagram illustrating one example of neighboring blocks of a current block.

FIG. 7 is a diagram illustrating one example of neighboring blocks of a current block.

Referring to FIG. 7, the neighboring blocks adjacent to a current block X may be divided into left blocks A0 and A1, upper blocks B0 and B1, and an edge block C. The present invention may configure a motion candidate list of prediction units PUs which belong to the same coding unit CU in parallel by restricting an order of deciding motion information availability for whether the neighboring blocks are usable as the motion candidate.

Figure 8:
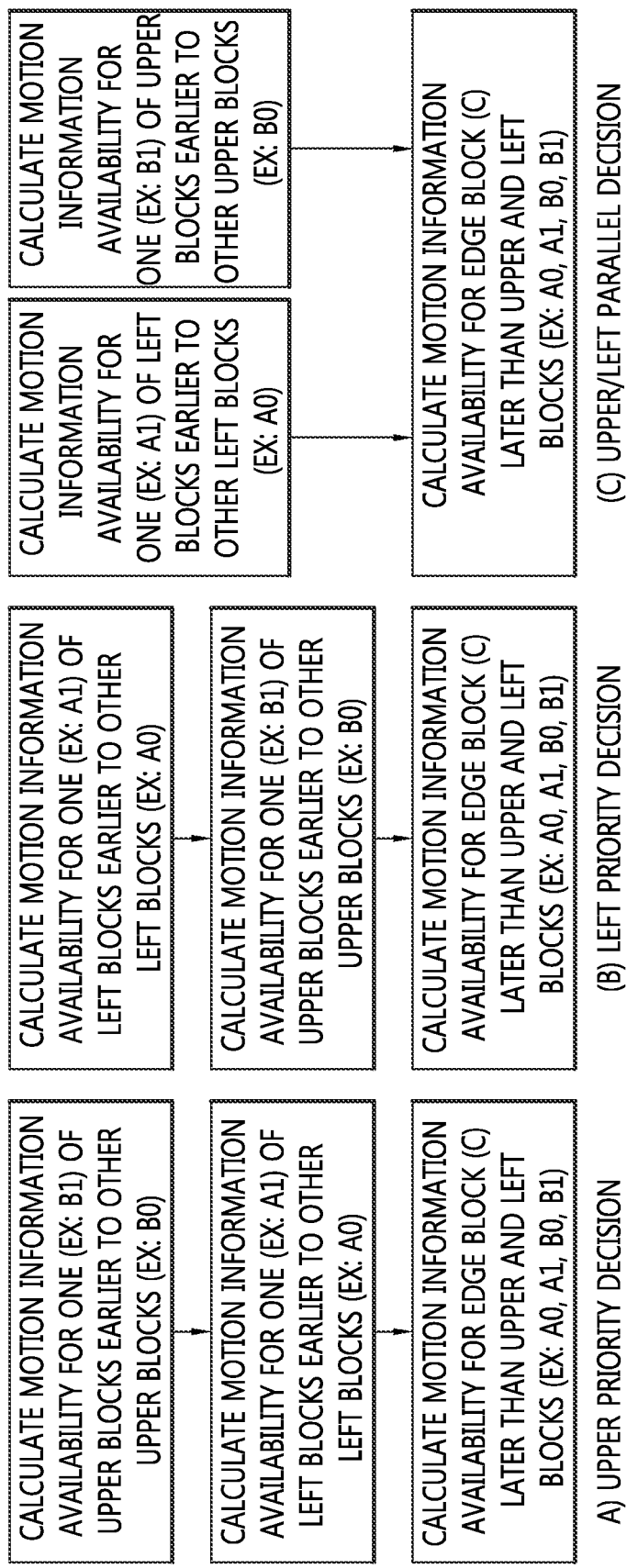
FIG. 8 is a diagram illustrating various examples for a method for restricting an order of deciding motion information availability.

FIG. 8 is a diagram illustrating various examples for a method for restricting an order of deciding motion information availability.

Referring to FIG. 8, a method for restricting an order of deciding motion information availability may include (a) an upper priority method, (b) a left priority method, and (c) an upper/left parallel method.

The upper priority method is a method of deciding motion information availability for one of the upper blocks earlier than other neighboring blocks, and the left priority method is a method of deciding motion information availability for one of the left blocks earlier than other neighboring blocks.

In order to increase parallelism of a process of deciding the motion information availability, the upper/left parallel deciding method like (c) may be used, and in this case, decision of the motion information availability for the left blocks and decision of the motion information availability for the upper blocks may be performed in parallel.

A motion information similarity determining process of determining sameness of the motion information may be included in the motion information availability determining process of each neighboring block so that a neighboring block having duplicated motion information is not included in the motion candidate list.

For example, when the motion information availability for B0 of FIG. 7 is determined, in the case where the motion information of B0 is the same as the motion information of B1, it is determined that the motion information of B0 is not available.

According to the present invention, even in the case where the motion information sameness determining process is included in the motion information availability determining process, the order of determining the motion information availability needs to be restricted as illustrated in FIG. 8. For example, only in the case where B1 is prior to B0 in the order of determining the motion information availability for the neighboring blocks, the motion information availability of B0 may be determined according to whether the motion information of B0 is the same as the motion information of B1.

On the other hand, that is, only in the case where B0 is prior to B1 in the order of determining the motion information availability for the neighboring blocks, the motion information availability of B0 may not be determined according to whether the motion information of B0 is the same as the motion information of B1.

In the present invention, (b) the left priority method among the three methods of restricting the order of deciding the motion information availability will be described as an example. However, the described contents including the availability determining process of the neighboring block and contents to be described below may be applied to (a) the upper priority deciding method and (c) the upper/left parallel deciding method, and this may be apparent to those skilled in the art.

According to the present invention, when the merge motion candidate list of the PU 1 of FIG. 5B is configured, the neighboring block B, may foreknow that the neighboring block A, is unusable. Accordingly, when the merge motion candidate list of the PU 1 of FIG. 5B is configured, the availability information of the neighboring block A, is verified, and as a result, whether the neighboring block B, and the neighboring block A, have the same motion information needs not to be verified.

In other words, in order to configure the merge motion candidate list of the PU 1 of FIG. 5B, since the merge motion candidate list needs not to access the motion information of the neighboring block A, which belongs in the same CU as the PU 1, the merge motion candidate lists of PU 0 and PU 1 may be configured in parallel.

Similarly, when the merge motion candidate list of the PU 1 of FIG. 6B is configured, the neighboring block $B_0$ may foreknow that the neighboring block B, is unusable. Accordingly, when the merge motion candidate list of the PU 1 of FIG. 6B is configured, the availability information of the neighboring block B, is verified, and as a result, whether the neighboring block B, and the neighboring block $B_0$ have the same motion information needs not to be verified.

In other words, in order to configure the merge motion candidate list of the PU 1 of FIG. 6B, since the merge motion candidate list needs not to access the motion information of the neighboring block B, which belongs in the same CU as the PU 1, the merge motion candidate lists of PU 0 and PU 1 may be configured in parallel.

A detailed method for restraining the motion information availability deciding order for neighboring blocks while configuring the merge motion candidate list of the PU in parallel may include a method for sequentially determining the availability information of the block motion information and a method for resetting the block availability information after determining availability of the neighboring blocks.

Figure 9:
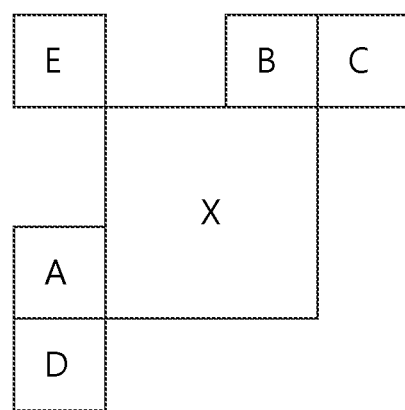
FIG. 9 is a diagram illustrating a neighboring block when availability information of block motion information is sequentially determined.

[Method 1] One Example of Sequentially Determining Availability Information of Block Motion Information in Configuring Merge Motion Candidate List FIG. 9 is a diagram illustrating a neighboring block when availability information of block motion information is sequentially determined and illustrates neighboring blocks A, B, C, D, and E of a current block X.

In the present invention, 'sequentially' may mean that information which is in a current or subsequent order is dependent on information which is in a previous order.

Whether the corresponding block motion information may be used as the motion information for the neighboring block (the availability information of the block motion information) may be determined in a predetermined order. In the case of following a left priority deciding method of most preferentially deciding motion information availability for one of left blocks to other neighboring blocks, it is determined whether motion information of a corresponding block may be used in a merge motion of a current block in the order of A, B, C, D, and E blocks and when the motion information of the corresponding block is usable, the motion information of the corresponding block may be input into the merge motion candidate list.

Figure 10:
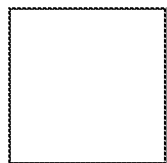
FIG. 10 illustrates an example in which one CU is partitioned into a plurality of Pus.
Figure 10:
Figure 10:
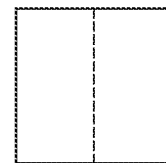
Figure 10:
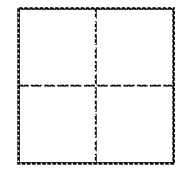
Figure 10:
Figure 10:
Figure 10:
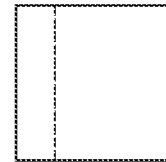
Figure 10:
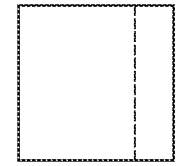

FIG. 10 illustrates an example in which one CU is partitioned into a plurality of PUs.

As illustrated in FIG. 10, the CU is not partitioned and may be a 2N×2N PU, and may be partitioned into 2N×N, N×2N, and N×N having the same size. Further, the CU may be asymmetrically partitioned like 2N×nU, 2N×nD, nL×2N, and nR×2N.

Figure 11:
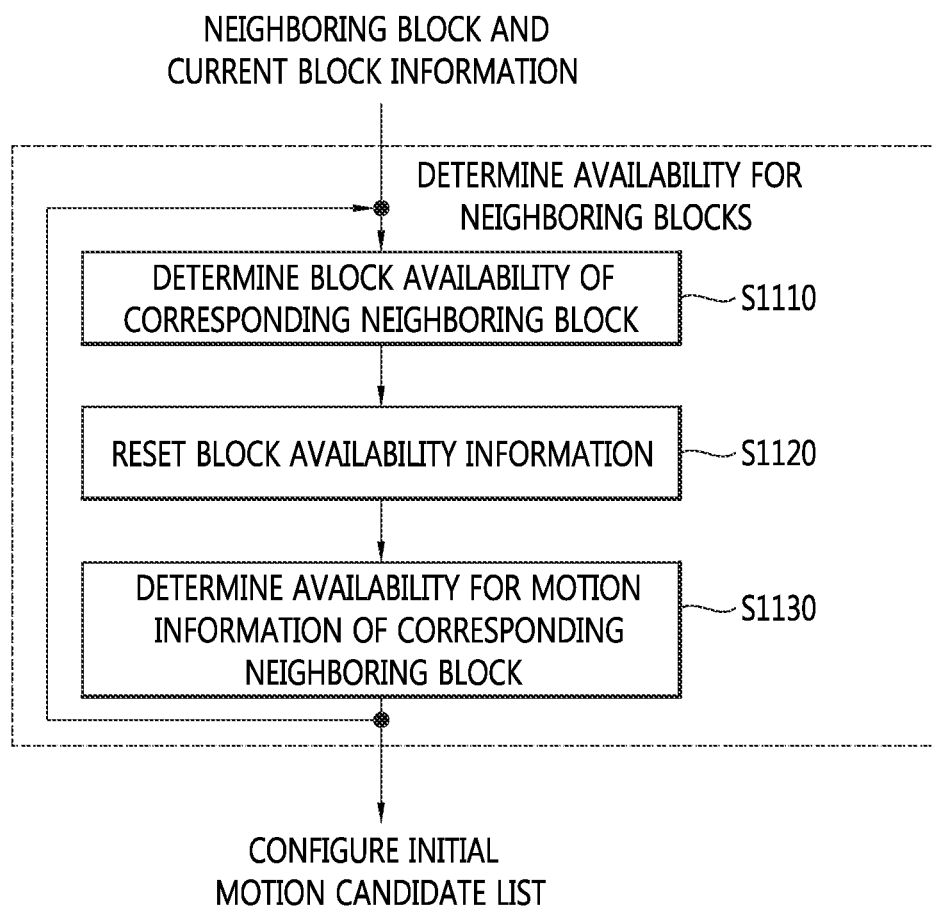
FIG. 11 is a control flowchart for describing a method for resetting block availability information according to an embodiment of the present invention.

[Method 2] One Example of Resetting Block Availability Information in Configuring Merge Motion Candidate List FIG. 11 is a control flowchart for describing a method for resetting block availability information according to an embodiment of the present invention. FIG. 11 illustrates one example of a structural diagram of a method for resetting block availability information in the step of determining the availability for the neighboring blocks of FIG. 4 (S410).

Referring to FIG. 11, first, block availability of the neighboring block indicating whether the neighboring blocks are present is determined (S1110). As a determination result, block availability information is output.

Thereafter, the block availability of the neighboring block is reset (S1120).

As one example, in regard to the PU 1 of FIG. 5(b), the $A_1$ block positioned at the PU 0 of FIG. 5(b) may not be included in the merge motion candidate list of the PU 1 in order to configure the merge motion candidate list with other PUs in parallel.

Therefore, block availability information of the A1 block positioned at the PU 0 of FIG. 5(b) is set to '0' to prevent the corresponding block from being used.

Next, the availability for the motion information of the neighboring block is determined based on the set block availability information (S1130). Through step S1130, the availability information of the block motion information indicating whether the motion information of the neighboring block may be included in the motion candidate list of the current block is output.

An initial motion candidate list is configured based on the availability information of the bock motion information.

The method for resetting the block availability information of FIG. 11 may be applied to a case in which one CU is partitioned into a plurality of PUs (as one example, 2N×N, N×2N, N×N, 2N×nU, 2N×nD, nL×2N, and nR×2N in FIG. 10), that is, PUs partitioned from one CU.

One example of a decoding process using the aforementioned method 1 will be described below.

Hereinafter, terms used in the present invention will be defined below.

PredMode represents a coding mode of a current prediction unit (PU), and MODE_SKIP, MODE_INTRA, and MODE_INTER are present.

Merge_flag represents whether the current PU block is encoded in a merge mode. When the current PU block is encoded in the merge mode, Merge_flag is set to '1' and Merge_flag may be set contrary to this.

merge_idx represents an index indicating the motion information for the current PU block in the motion information candidate list.

log 2_parallel_merge_level_minus2 defines a level of a parallel merge skip. According to the present invention, the merge skip may be analyzed as a term indicating a merge mode and a skip mode among modes applied to an inter-screen prediction and the parallel merge skip may mean that the merge motion candidate list may be configured in parallel between blocks within a specific region when the merge mode and/or the skip mode are/is applied.

For example, when a value of the log 2_parallel_merge_level_minus2 is '0', the parallel merge skip is not performed. When the value of the log 2_parallel_merge_level_minus2 is '1', the parallel merge skip is performed with respect to all PUs in an 8×8 block. When the value of the log 2_parallel_merge_level_minus2 is '2', the parallel merge skip is performed with respect to all PUs in a 16×16 block and when the value of the log 2_parallel_merge_level_minus2 is '3', the parallel merge skip is performed with respect to all PUs in a 32×32 block. When the value of the log 2_parallel_merge_level_minus2 is '4', the parallel merge skip is performed with respect to all Pus in a 64×64 block.

Z-Scan Availability Derivation Process

[1] An input in the Z-scan availability derivation process will be described below.

(xCurr, yCurr): a left top position of a current block associated with a position of a left top position of a current picture;

(xN, yN): a left top position of a neighboring block associated with the position of the left top position of the current picture An output in the Z-scan availability derivation process will be described below.

availableN: Available information of the neighboring block at a position (xN, yN)

[2] minBlockAddrCurr is set as an address of a minimum luminance block in a z-scan order for the current block. In this case, the minBlockAddrCurr is as follows.

minBlockAddrCurr=MinTbAddrZS[xCurr>>Log 2Min-TrafoSize][yCurr>>Log 2MinTrafoSize]

(Herein, MinTbAddrZS means a z-scan order array in a minimum transform block and log 2MinTrafoSize means the size of the minimum transform block.

[3] minBlockAddrN is set as an address of the minimum luminance block in a z-scan order for a neighboring block having the position (xN, yN).

If even one of following conditions (1) to (4) is 'true', minBlockAddrN is set to '1'.

(1) xN is smaller than '0'.
(2) yN is smaller than '0'.
(3) xN is larger than pic_width_in_luma_sample (the width of a video).
(4) yN is larger than pic_height_in_luma_sample (the width of the video).

Otherwise (that is, if the position (xN, yN) is in a picture boundary, the following is applied.

minBlockAddrN=MinTbAddrZS[xN>>Log 2MinTrafo-Size][yN>>Log 2MinTrafoSize]

[4] The neighboring block availability information availableN is derived through the following process.

If even one of the following conditions (1) to (4) is 'true', availableN is set as 'false'.

(1) minBlockAddrN is smaller than '0'.
(2) minBlockAddr is larger than minBlockAddrCurr.
  (3) An address index of a slice including the neighboring block having minBlockAddrN is different from an address index of a slice including the current block having minBlockAddrCurr.
  (4) The neighboring block having minBlockAddrN is positioned a tile different from the current block having minBlockAddrCurr. (herein, the tile is the same concept as dividing the video into slices and coding information of the block is not derived between the tiles.

Otherwise, availableN is set as 'true'.

Availability Derivation Process of Prediction Block

[1] An input in the availability derivation process of the prediction block will be described below.

(xC, yC): a left top position of a current luminance coding block associated with the left top position of the current picture;

(nCS): variable indicating the size of the current CU;

(xP, yP): the left top position of the current luminance coding block associated with the left top position of the current picture;

(nPbW, nPbH): a variable indicating the width and the height of the current PU within the current CU block;

(partIdx): index of the current PU within the current CU block;

(xN, yN): the position of the neighboring block associated with the left top position of the current picture;

An output in the availability derivation process of the prediction block will be described below.

availableN: Available information of the neighboring block at the position (xN, yN)

[2] A variable sameCb is defined to represent whether the current luminance prediction block and a neighboring luminance prediction block are the same luminance coding block.

If the following conditions (1) to (4) are all 'true', sameCb is set as 'true'.
(1) xC is equal to or smaller than xN.
(2) yC is equal to or smaller than yN.
(3) (xC+nCbS) is larger than xN.
(4) (yC+nCbS) is larger than yN.
Otherwise, sameCb is set as 'false'.

Herein, if sameCb is 'true', it may be meant whether the current luminance prediction block and the neighboring luminance prediction block are included in the same luminance coding block or vice versa.

[3] The availability information of the neighboring prediction block, availableN is derived as follows.

If sameCb is 'false', availableN is set by applying the z-scan availability derivation process.

Or, if the following conditions (1) to (5) are all 'true', availableN is set as 'false'.
(1) (nPbW<<1) is equal to nCbS.
(2) (nPbH<<1) is equal to nCbS.
(3) partIdx is '1'.
(4) (yC+nPbH) is equal to or less than yN.
(5) (xC+nPbW) is larger than xN.
Otherwise, availableN is set as 'true'.

When availableN is 'true' and PredMode[xN][yN] is MODE_INTRA, availableN is set as 'false'.

Process of Deriving Motion Vector and Reference Picture Index

[1] An input in the process of deriving the motion vector and the reference picture index will be described below.
(xC yC): the left top position of the current coding unit (CU) block;
(xB, yB): the left top position of the current PU;
(nCS): a variable indicating the size of the current CU;
(nPSW, nPSH): a variable indicating the width and the height of the current PU;
(partIdx): an index of the current PU within the current CU block;

An output in the process of deriving the motion vector and the reference picture index will be described below.
(mvL0 ≠ mvL1): a motion vector for a luminance sample;
(mvCL0 ≠ mvCL1): a motion vector for a chrominance sample;
Reference picture indexes; refIdxL0 and refIdxL1
predFlagL0 ≠ predFlagL1: a variable indicating whether a prediction list is usable (an L0 or L1 prediction is performed)

[2] The position of the current PU block is set as xP=xC+xB, yP=yC+yB.

[3] mvL0, mvL1, refIdxL0, refIdxL1, PredFlagL0 and PredFlagL1 are derived through the following process.

If PredMode is MODE_SKIP, a process of deriving a luminance motion vector for the merge mode is performed. Herein, inputs are (xC, yC), (xP, yP), nCS, nPSW, nPSH, and partIdx and outputs are mvL0, mvL1, refIdxL0, refIdxL1, PredFlagL0, and PredFlagL1.

Or, if PredMode is MODE_INTER and merge_flag for the current PU block is '1', the process of deriving the luminance motion vector for the merge mode is performed. Herein, the inputs are (xC, yC), (xP, yP), nCS, nPSW, nPSH, and partIdx and the outputs are mvL0, mvL1, refIdxL0, refIdxL1, PredFlagL0, and PredFlagL1.

Otherwise, mvLX, refIdxLX, and PredFlagLX are set by syntax elements ref_idx_Ix and mvd_IX. Herein, X may be replaced with '0' or '1'.

Process of Deriving Luminance Motion Vector for Merge Mode

[1] An input in the process of deriving the luminance motion vector for the merge mode will be described below.
(xC yC): the left top position of the current coding unit (CU) block;
(xP, yP): the left top position of the current PU;
(nCS): a variable indicating the size of the current CU;
(nPSW, nPSH): a variable indicating the width and the height of the current PU;
(partIdx): an index of the current PU within the current CU block;

An output in the process of deriving the luminance motion vector for the merge mode will be described below.
(mvL0 ≠ mvL1): a motion vector for a luminance sample;
refIdxL0 and refIdxL1: reference picture indexes;
predFlagL0 ≠ predFlagL1: a variable indicating whether the prediction list is usable (the L0 or L1 prediction is performed)

[2] A variable singleMCLFlag (a common merge candidate list flag) is derived as follows.

If the value of log 2_parallel_merge_level_minus2 is larger than '0' and a value of nCS is '8', singleMCLFlag is set to '1'.

Otherwise, singleMCLFlag is set to '0'.

[3] The left top position (xP, yP) of the current PU and the variables nPSW and nPSH indicating the width and the height of the current PU are derived as follows.

If singleMCLFlag is '1', xC is input into xP, yC is input into yP, and nCS is input into nPSW and nPSH.

Additional explanation: When the value of singleMCLFlag is set to '1', all PU blocks in one CU shares the merge candidate list for the 2N×2N PU regardless of a partition form.

[4] A step of configuring the merge candidate list to be used in a merge coding mode and setting the motion information mvL0, mvL1, refIdxL0, refIdxL1, PredFlagL0, and PredFlagL1 for the current PU is performed in an order described below.

[4-1] A process of setting a merge motion candidate from a neighboring PU of the current CU including the current PU is performed.

Herein, the inputs are (xP, yP), nPSH, nPSW, singleMCLFlag and the outputs are availableFlagN (a variable indicating whether the neighboring PU is usable), mvL0N, mvL1N, refIdxL0N, refIdxL1N, PredFlagL0N, and PredFlagL1N. (Herein, N may be replaced with A1, B1, B0, A0, and B2 of FIG. 12 and X may be replaced with '0' or '1'.)

[4-2] A reference picture index for a temporal merge motion candidate, refIdxLX is set to '0'. Herein, X may be replaced with '0' or '1'.

[4-3] A process of setting temporally inferred motion information as the merge motion candidate is performed. Herein, the inputs are (xP, yP), nPSH, nPSW, refIdxLX and the outputs are availableFlagLXCol (a variable indicating whether the temporally inferred motion information is usable) and mvLXCol (the temporally inferred motion information).

availableFlagCol (the variable indicating whether the temporally inferred motion information is usable) and PredFlagLXCol (a variable indicating whether a prediction list for the temporally inferred motion information is usable (whether the L0 or L1 prediction is performed) are set as follows.

availableFlagCol=availableFlagL0Col||availableFlagL1Col
PredFlagLXCol=availableFlagLXCol

[4-4] Next, the merge candidate list is configured as follows.

Figure 12:
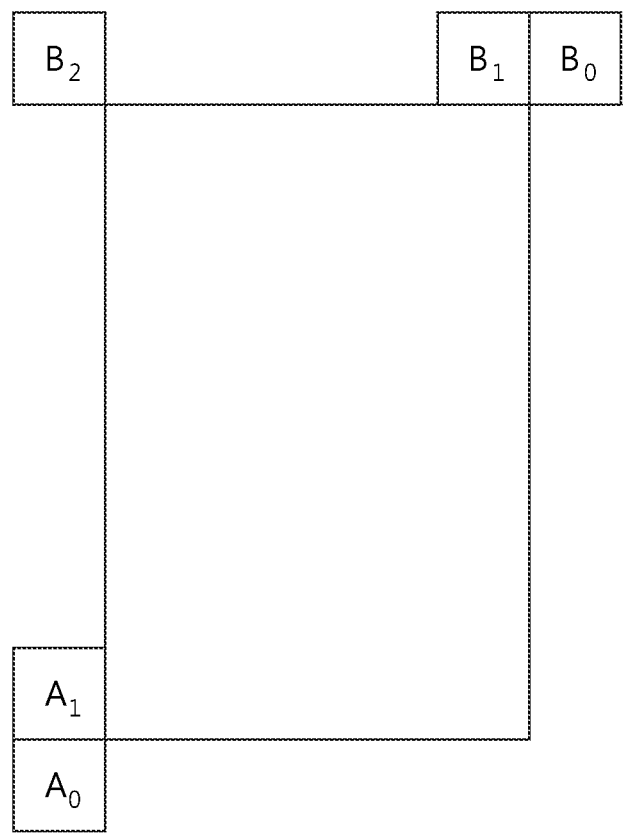
FIG. 12 is a diagram illustrating the current block and the neighboring block for describing creation of a merge candidate list of the current block.

FIG. 12 is a diagram illustrating the current block and the neighboring block for describing creation of the merge candidate list of the current block.

The position of a pixel that is present at a left top of the current block, that is, a prediction target block is defined as (xP, yP), the width of the prediction target block is defines as nPSW, and the height of the prediction target block is defined as a variable nPSH.

Hereinafter, in the embodiment of the present invention, a spatial neighboring prediction block may include a left A1 block which is a block including a pixel that is present in (xP−1, yP+nPSH−1), an A0 block which is a block including a pixel which is present in (xP−1, yP+nPSH), a B0 block which is a block including a pixel positioned in (xP+nPSW, yP−1), a B1 block which is a block including a pixel positioned in (xP+nPSW−MinPuSize, yP−1), and a B2 block which is a block including a pixel positioned in (xP−MinPuSize, yP−1).

When the motion information of the corresponding block is usable in the order of A1, B1, B0, A0, B2, and Col of FIG. 12, the motion information of the corresponding block is sequentially input into the merge candidate list. Herein, Col represents temporally inferred motion information.

[4-5] When the same motion information is present within the merge candidate list, a step of leaving only one corresponding motion information is performed.

[4-6] A step of setting the number of motion information of the merge candidate list and the maximum number of the merge candidate lists to '5' is performed.

[4-7] A step of adding a combination amount prediction merge candidate is performed when the corresponding picture is a B picture.

[4-8] A step of adding zero (0,0) motion information as a merge candidate is performed.

[4-9] A step of setting motion information which is present in merge_idx in the merge candidate list as the motion information of the current PU is performed.

Step of Setting Merge Motion Candidate from Neighboring PU (Spatial PU) of Current PU

[1] An input in a step of setting the merge motion candidate from the neighboring PU (spatial PU) of the current PU will be described below.

(xC yC): the left top position of the current coding unit (CU) block;
(xP, yP): the left top position of the current PU;
(nCS): a variable indicating the size of the current CU;
(nPSW, nPSH): a variable indicating the width and the height of the current PU;
singleMCLFlag: a variable indicating whether a common merge candidate list for the current CU is usable;
(partIdx): an index of the current PU within the current CU block;

An output in the step of setting the merge motion candidate from the neighboring PU (spatial PU) of the current PU will be described below. (Herein, N may be replaced with A1, B1, B0, A0, and B2 of FIG. 12 and X may be replaced with '0' or '1'.)

availableFlagN: a variable indicating whether motion information of a neighboring PU N is available;
refIdxLXN: a reference index of the neighboring PU N;
predFlagLXN: a variable indicating whether a prediction list for the neighboring PU N is usable;
mvLXN: a motion vector for the neighboring PU N

[2] A derivation order (restriction) according to a left priority deciding method below is applied in order to derive availableFlagN of the neighboring PU A0, A1, B0, B1, or B2 through the process of [3] below.

A1 needs to derive availableFlagN (herein, N=A1) earlier than A0, B0, B1, and B2.

B1 needs to derive availableFlagN (herein, N=B1) earlier than B0 and B2.

B2 needs to derive availableFlagN (herein, N=B2) later than A0, A1, B0, and B1.

An example of an order of deriving motion information availability of a neighboring block which coincides with the order restriction of the left priority deciding method will be described below.

A1→B1→A0→B0→B2,
A1→B1→B0→A0→B2
A1→B1→A0 and B0 (parallel derivation possible)→B2
A1→A0 B1→B0→B2
A1→A0 and B1 (parallel derivation possible)→B0→B2

[3] A process for determining whether the neighboring PU (spatial PU) of the current PU is usable as the merge motion candidate adopts a content below. (Herein, the neighboring PU represents A1, B1, B0, A0, and B2 of FIG. 12, N may be replaced with A1, B1, B0, A0, and B2 of FIG. 12, and (xN, yN) may be replaced with (xC−1, yC+nCS), (xC−1, yC+nCS−1), (xC+nCS, yC−1), (xC+nCS−1, yC−1), and (xC−1, yC−1).

[3-1] A process of determining whether the neighboring PU is available is performed, and the inputs are (xC, yC), (xP, yP), nPbW, nPbH, (xN, yN), and partIdx and the output is the availability information of the PU positioned in (xN, yN), availableN.

[3-3] If even one of the following conditions (1) to (10) is 'true', availableFlagN is set to '0' and mvLXN is set to '0,0'.

(1) (xP>>(log 2_parallel_merge_level_minus2+2)) is the same as (xN>>(log 2_parallel_merge_level_minus2+2)) and (yP>>(log 2_parallel_merge_level_minus2+2)) is the same as (yN>>(log 2_parallel_merge_level_minus2+2)).

(2) N is B2 and availableFlagA0+availableFlagA1+availableFlagB0+availableFlagB1 is '4'.

(3) The PU which is at the position [xN, yN] is disabled or encoded in an in-screen mode. That is, availableN is '0'.

(4) singleMCLFlag is '0', the partition form of the current PU is PART_2N×N, PART_2N×nU, or PART_2N×nD, PartIdx is '1', and N is 'B1'.

(5) singleMCLFlag is '0', the partition form of the current PU is PART_N×2N, PART_nL×2N, or PART_nR×2N, PartIdx is '1', and N is 'A1'.

(6) As a process of determining the similarity of the motion information, N is B1, and the motion information of the PU positioned in (xA1, yA1) and the motion information positioned in (xN, yN) are the same as each other.

(7) As the process of determining the similarity of the motion information, N is B0, and the motion information of the PU positioned in (xB1, yB1) and the motion information positioned in (xN, yN) are the same as each other.

(8) As the process of determining the similarity of the motion information, N is A0, and the motion information of the PU positioned in (xA1, yA1) and the motion information positioned in (xN, yN) are the same as each other.
(9) As a process of determining the similarity of the motion information, N is B2, and the motion information of the PU positioned in (xA1, yA1) and the motion information positioned in (xN, yN) are the same as each other.
(10) As the process of determining the similarity of the motion information, N is B2, and the motion information of the PU positioned in (xB1, yB1) and the motion information positioned in (xN, yN) are the same as each other.

Otherwise, availableFlagN is set to '1', and mvLXN, refIdxLXN, and predFlagLXN are set to mvLX[xN, yN], refIdxLX[xN, yN], and predFlagLX[xN, yN], respectively.

The step of setting the merge motion candidate from the neighboring PU (spatial PU) of the current PU of the method 1 may be modified as below according to one example of the present invention.

[1] An input in the step of setting the merge motion candidate from the neighboring PU (spatial PU) of the current PU will be described below.
  (xC yC): the left top position of the current coding unit (CU) block;
  (xP, yP): the left top position of the current PU;
  (nCS): a variable indicating the size of the current CU;
  (nPSW, nPSH): a variable indicating the width and the height of the current PU;
  singleMCLFlag: a variable indicating whether a common merge candidate list for the current CU is usable;
  (partIdx): an index of the current PU within the current CU block An output in this step will be described below. (Herein, N may be replaced with A1, B1, B0, A0, and B2 of FIG. 12 and X may be replaced with '0' or '1'.)
  availableFlagN: a variable indicating whether motion information of a neighboring PU N is available;
  refIdxLXN: a reference index of the neighboring PU N;
  predFlagLXN: a variable indicating whether a prediction list for the neighboring PU N is usable;
  mvLXN: a motion vector for the neighboring PU N;

A derivation order (restriction) below is applied in order to derive availableFlagN of the neighboring PU A0, A1, B0, B1, or B2 through the process of [3] below.

B2 needs to derive availableFlagN (herein, N=B2) later than A0, A1, B0, and B1.

[3] A process for determining whether the neighboring PU (spatial PU) of the current PU is usable as the merge motion candidate will be described below. (Herein, the neighboring PU represents A1, B1, B0, A0, and B2 of FIG. 12, N may be replaced with A1, B1, B0, A0, and B2 of FIG. 12, and (xN, yN) may be replaced with (xC−1, yC+nCS), (xC−1, yC+nCS−1), (xC+nCS, yC−1), (xC+nCS−1, yC−1), and (xC−1, yC−1).

[3-1] It is determined whether the neighboring PU is available, and the inputs are (xC, yC), (xP, yP), nPbW, nPbH, (xN, yN), and partIdx and the output is the availability information of the PU positioned in (xN, yN), availableN.

[3-2] If even one of the following conditions (1) to (3) is 'true', availableN is set to '0'.
  (1) (xP>>(log 2_parallel_merge_level_minus2+2)) is the same as (xN>>(log 2_parallel_merge_level_minus2+2)) and (yP>>(log 2_parallel_merge_level_minus2+2)) is the same as (yN>>(log 2_parallel_merge_level_minus2+2)).
  (2) singleMCLFlag is '0', the partition form of the current PU is PART_2N×N, PART_2N×nU, or PART_2N×nD, PartIdx is '1', and N is '1'.
  (3) singleMCLFlag is '0', the partition form of the current PU is PART_N×2N, PART_nL×2N, or PART_nR×2N, PartIdx is '1', and N is 'A1'.

[3-2] If even one of the following conditions is 'true', availableFlagN is set to '0' and mvLXN is set to '0.0'.
  (1) N is B1, and availableFlagA0+availableFlagA1+availableFlagB0+availableFlagB1 is '4'.
  (2) The PU positioned at [xN, yN] is disabled or encoded intra. That is, availableN is '0'.
  (3) As a process of determining the similarity of the motion information, N is B1, and the motion information of the PU positioned in (xA1, yA1) and the motion information positioned in (xN, yN) are the same as each other.
  (4) As the process of determining the similarity of the motion information, N is B0, and the motion information of the PU positioned in (xB1, yB1) and the motion information positioned in (xN, yN) are the same as each other.
  (5) As the process of determining the similarity of the motion information, N is A0, and the motion information of the PU positioned in (xA1, yA1) and the motion information positioned in (xN, yN) are the same as each other.
  (6) As a process of determining the similarity of the motion information, N is B2, and the motion information of the PU positioned in (xA1, yA1) and the motion information positioned in (xN, yN) are the same as each other.
  (7) As the process of determining the similarity of the motion information, N is the same as B2, and the motion information of the PU positioned in (xB1, yB1) and the motion information positioned in (xN, yN) are the same as each other.

[3-3] Otherwise, availableFlagN is set to '1', and mvLX [xN, yN], refIdxLX[xN, yN], and predFlagLX[xN, yN] are set to mvLXN, refIdxLXN, and predFlagLXN, respectively.

The step of setting the merge motion candidate from the neighboring PU (spatial PU) of the current PU of the method 1 may be modified as below according to another example of the present invention.

[1] An input in the step of setting the merge motion candidate from the neighboring PU (spatial PU) of the current PU will be described below.
  (xC yC): the left top position of the current coding unit (CU) block;
  (xP, yP): the left top position of the current PU;
  (nCS): a variable indicating the size of the current CU;
  (nPSW, nPSH): a variable indicating the width and the height of the current PU;
  singleMCLFlag: a variable indicating whether a common merge candidate list for the current CU is usable;
  (partIdx): an index of the current PU within the current CU block;

An output in this step will be described below. Herein, N may be replaced with A1, B1, B0, A0, and B2 of FIG. 12 and X may be replaced with '0' or '1'.
  availableFlagN: a variable indicating whether motion information of a neighboring PU N is available;
  refIdxLXN: a reference index of the neighboring PU N;
  predFlagLXN: a variable indicating whether a prediction list for the neighboring PU N is usable;
  mvLXN: a motion vector for the neighboring PU N

[2] The process for determining whether the neighboring PU (spatial PU) of the current PU is usable as the merge motion candidate adopts a content below. Herein, the neighboring PU represents A1, B1, B0, and A0 of FIG. 12, N may be replaced with A1, B1, B0, and A0 of FIG. 12, and (xN, yN) may be replaced with (xC−1, yC+nCS), (xC−1, yC+nCS−1), (xC+nCS, yC−1), and (xC+nCS−1, yC−1).

[2-1] The process of determining whether the neighboring PU is available is performed, and herein, the inputs are (xC, yC), (xP, yP), nPbW, nPbH, (xN, yN), and partIdx and the output is the availability information of the PU positioned in (xN, yN), availableN.

[2-2] If even one of the following conditions (1) to (10) is 'true', availableFlagN is set to '0'.
(1) (xP>>(log 2_parallel_merge_level_minus2+2)) is the same as (xN>>(log 2_parallel_merge_level_minus2+2)) and (yP>>(log 2_parallel_merge_level_minus2+2)) is the same as (yN>>(log 2_parallel_merge_level_minus2+2)).
(2) singleMCLFlag is '0', the partition form of the current PU is PART_2N×N, PART_2N×nU, or PART_2N×nD, PartIdx is '1', and N is 'B1'.
(3) singleMCLFlag is '0', the partition form of the current PU is PART_N×2N, PART_nL×2N, or PART_nR×2N, PartIdx is '1', and N is 'A1'.

[4-2] If even one of the following conditions is 'true', availableFlagN is set to '0' and mvLXN is set to '0.0'.
(5) The PU positioned at [xN, yN] is disabled or encoded intra. (That is, availableN is '0'.)
(6) As the process of determining the similarity of the motion information, N is B1, availableA1=1, and the motion information of the PU positioned in (xA1, yA1) and the motion information positioned in (xN, yN) are the same as each other.
(7) As the process of determining the similarity of the motion information, N is B0, availableB1=1, and the motion information of the PU positioned in (xB1, yB1) and the motion information positioned in (xN, yN) are the same as each other.
(8) As the process of determining the similarity of the motion information, N is A0, availableA1=1, and the motion information of the PU positioned in (xA1, yA1) and the motion information positioned in (xN, yN) are the same as each other.
(9) As the process of determining the similarity of the motion information, N is B2, availableA1=1, and the motion information of the PU positioned in (xA1, yA1) and the motion information positioned in (xN, yN) are the same as each other.
(10) As the process of determining the similarity of the motion information, N is B2, availableB1=1, and the motion information of the PU positioned in (xB1, yB1) and the motion information positioned in (xN, yN) are the same as each other.

Otherwise, availableFlagN is set to '1', and mvLX[xN, yN], refIdxLX[xN, yN], and predFlagLX[xN, yN] are set to mvLXN, refIdxLXN, predFlagLXN, respectively.

[3] availableFlagN (herein, N=B2) of B2 is derived later than A0, A1, B0, and B1. The process for determining whether the neighboring PU (spatial PU) of the current PU is usable as the merge motion candidate adopts a content below. Herein, (xB2, yB2) may be replaced with (xC−1, yC−1).

[3-1] The process of determining whether the neighboring PU is available is performed, and herein, the inputs are (xC, yC), (xP, yP), nPbW, nPbH, (xB2, yB2), and partIdx and the output is the availability information of the PU positioned in (xB2, yB2), availableB2.

[3-2] If the following conditions is 'true', availableFlagB2 is set to '0' and mvLXB2 is set to '0.0'.
availableFlagA0+availableFlagA1+availableFlagB0+availableFlagB1 is equal to '4'.

Otherwise, availableFlagB2 is set to '1', and mvLX[xB2, yB2], refIdxLX[xB2, yB2], and predFlagLX[xB2, yB2] are set to mvLXB2, refIdxLXB2, and predFlagLXB2, respectively.

The step of setting the merge motion candidate from the neighboring PU (spatial PU) of the current PU of the method 1 may be modified as below according to yet another example of the present invention.

[1] An input in the step of setting the merge motion candidate from the neighboring PU (spatial PU) of the current PU will be described below.
(xC yC): the left top position of the current coding unit (CU) block;
(xP, yP): the left top position of the current PU;
(nCS): a variable indicating the size of the current CU;
(nPSW, nPSH): a variable indicating the width and the height of the current PU;
singleMCLFlag: a variable indicating whether a common merge candidate list for the current CU is usable;
an index of the current PU within the current CU block; (partIdx)

An output in this step will be described below. (Herein, N may be replaced with A1, B1, B0, A0, and B2 of FIG. 12 and X may be replaced with '0' or '1'.)
availableFlagN: a variable indicating whether motion information of a neighboring PU N is available;
refIdxLXN: a reference index of the neighboring PU N;
predFlagLXN: a variable indicating whether a prediction list for the neighboring PU N is usable;
mvLXN: a motion vector for the neighboring PU N

[2] The process for determining whether the neighboring PU (spatial PU) of the current PU is usable as the merge motion candidate is performed in the order of the A1, B1, B0, A0, and B2 according to the left priority deciding method. Herein, the neighboring PU represents A1, B1, B0, A0, and B2 of FIG. 12, N may be replaced with A1, B1, B0, A0, and B2 of FIG. 12, and (xN, yN) may be replaced with (xC−1, yC+nCS), (xC−1, yC+nCS−1), (xC+nCS, yC−1), (xC+nCS−1, yC−1), and (xC−1, yC−1).

[2-1] The process of determining whether the neighboring PU is available is performed, and herein, the inputs are (xC, yC), (xP, yP), nPbW, nPbH, (xN, yN), and partIdx and the output is the availability information of the PU positioned in (xN, yN), availableN.

[2-2] If even one of the following conditions (1) to (10) is 'true', availableFlagN is set to '0' and mvLXN is set to '0,0'.
(1) (xP>>(log 2_parallel_merge_level_minus2+2)) is the same as (xN>>(log 2_parallel_merge_level_minus2+2)) and (yP>>(log 2_parallel_merge_level_minus2+2)) is the same as (yN>>(log 2_parallel_merge_level_minus2+2)).
(2) N is B1, and availableFlagA0+availableFlagA1+availableFlagB0+availableFlagB1 is '4'.
(3) The PU positioned at [xN, yN] is disabled or encoded intra. That is, availableN is '0'.
(4) singleMCLFlag is '0', the partition form of the current PU is PART_2N×N, PART_2N×nU, or PART_2N×nD, PartIdx is '1', and N is 'B1'.

(5) singleMCLFlag is '0', the partition form of the current PU is PART_N×2N, PART_nL×2N, or PART_nR×2N, PartIdx is '1', and N is 'A1'.

(6) As the process of determining the similarity of the motion information, N is equal to B1, and the motion information of the PU positioned in (xA1, yA1) and the motion information positioned in (xN, yN) are the same as each other.

(7) As the process of determining the similarity of the motion information, N is B0, and the motion information of the PU positioned in (xB1, yB1) and the motion information positioned in (xN, yN) are the same as each other.

(8) As the process of determining the similarity of the motion information, N is A0, and the motion information of the PU positioned in (xA1, yA1) and the motion information positioned in (xN, yN) are the same as each other.

(9) As a process of determining the similarity of the motion information, N is B2, and the motion information of the PU positioned in (xA1, yA1) and the motion information positioned in (xN, yN) are the same as each other.

(10) As the process of determining the similarity of the motion information, N is B2, and the motion information of the PU positioned in (xB1, yB1) and the motion information positioned in (xN, yN) are the same as each other.

Otherwise, availableFlagN is set to '1', and mvLX[xN, yN], refIdxLX[xN, yN], and predFlagLX[xN, yN] are set to mvLXN, refIdxLXN, predFlagLXN, respectively.

Application ranges of all of the aforementioned methods may be changed depending on the size of the block or the depth of the CU. An encoder or a decoder may be set to use predetermined values as the variables (that is, the size or depth information) for deciding the application range, use a predetermined value according to a profile or a level, and when the encoder writes a variable value in a bitstream, the decoder derives the variable value from the bitstream to be used.

When the application range is changed depending on the depth of the CU, a method (A) applied to only a predetermined depth or more, a method (B) applied to only the predetermined depth, and a method (C) applied to only the predetermined depth may be used, as illustrated in Table 1 below.

TABLE 1

| CU depth indicating application range | Method A | Method B | Method C |
| --- | --- | --- | --- |
| 0 | X | O | X |
| 1 | X | O | X |
| 2 | O | O | O |
| 3 | O | X | X |
| 4 | O | X | X |

"O" of Table 1 represents a case in which the method of determining whether the motion information is available is applied to the corresponding depth and "X" represent a case in which the method of determining whether the motion information is available is not applied to the corresponding depth.

Referring to Table 1, all of the aforementioned methods may be applied to a case in which the CU depth is 2. Table 1 illustrates one example and may be modified.

In the aforementioned embodiments, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

The aforementioned embodiments include examples of various aspects. All available combinations for expressing various aspects cannot be described, but it can be recognized by those skilled in the art that other combinations can be used. Therefore, all other substitutions, modifications, and changes of the present invention that belong to the appended claims can be made.

The invention claimed is:

1. A video decoding method, comprising:
deriving information for block availability of a neighboring block for a current block;
deriving information for motion information availability of the neighboring block of the current block based on the information for block availability of the neighboring block;
constructing a merge candidate list for the current block based on the derived information for motion information availability of the neighboring block;
determining motion information of the current block based on the merge candidate list; and
obtaining prediction samples of the current block by using the motion information of the current block,
wherein the deriving information for block availability of the neighboring block comprises:
in a block availability derivation process of the neighboring block, deriving the information for block availability of the neighboring block based on whether slice information and tile information of the neighboring block are equal to slice information and tile information of the current block and whether a prediction mode of the neighboring block is an inter prediction mode or not; and
in a step of setting merge candidate from neighboring blocks of the current block, resetting the derived information for block availability of the neighboring block based on parallel merge level information indicating a size of a block in which a parallel merge processing is applicable,
wherein the information for block availability indicates whether a corresponding neighboring block is usable for an inter prediction of the current block and the information for motion information availability indicates whether motion information of the corresponding neighboring block is included in the merge candidate list,
wherein the information for motion information availability of the neighboring block is derived by a predetermined order restriction.

2. A video encoding method, comprising:
determining motion information of a current block;
obtaining prediction samples of the current block;
deriving information for block availability of a neighboring block for the current block;
deriving information for motion information availability of the neighboring block of the current block based on the information for block availability of the neighboring block; and constructing a merge candidate list for the current block based on the derived information for motion information availability of the neighboring block;
wherein the deriving information for block availability of the neighboring block comprises:
in a block availability derivation process of the neighboring block, deriving the information for block availability of the neighboring block based on whether slice information and tile information of the neighboring block are equal to slice information and tile information of the current block and whether a prediction mode of the neighboring block is an inter prediction mode or not; and
in a step of setting merge candidate from neighboring blocks of the current block, resetting the derived information for block availability of the neighboring block based on parallel merge level information indicating a size of a block in which a parallel merge processing is applicable,
wherein the information for block availability indicates whether a corresponding neighboring block is usable for an inter prediction of the current block and the information for motion information availability indicates whether motion information of the corresponding neighboring block is included in the merge candidate list,
wherein the information for motion information availability of the neighboring block is derived by a predetermined order restriction.

3. A method for transmitting a bitstream comprising:
determining motion information of a current block;
obtaining prediction samples of the current block;
deriving information for block availability of a neighboring block for the current block;
deriving information for motion information availability of the neighboring block of the current block based on the information for block availability of the neighboring block;
constructing a merge candidate list for the current block based on the derived information for motion information availability of the neighboring block; and
transmitting the bitstream including information related to the motion information of the current block;
wherein the deriving information for block availability of the neighboring block comprises:
in a block availability derivation process of the neighboring block, deriving the information for block availability of the neighboring block based on whether slice information and tile information of the neighboring block are equal to slice information and tile information of the current block and whether a prediction mode of the neighboring block is an inter prediction mode or not; and
in a step of setting merge candidate from neighboring blocks of the current block, resetting the derived information for block availability of the neighboring block based on parallel merge level information indicating a size of a block in which a parallel merge processing is applicable,
wherein the information for block availability indicates whether a corresponding neighboring block is usable for an inter prediction of the current block and the information for motion information availability indicates whether motion information of the corresponding neighboring block is included in the merge candidate list,
wherein the information for motion information availability of the neighboring block is derived by a predetermined order restriction.

* * * * *